(12) United States Patent
Baltes et al.

(10) Patent No.: US 10,562,236 B2
(45) Date of Patent: Feb. 18, 2020

(54) DEVICE AND METHOD FOR INDUCTIVELY HEATING PACKAGE SLEEVES

(71) Applicant: SIG Technology AG, Neuhausen am Rheinfall (CH)

(72) Inventors: Klaus Baltes, Bergheim (DE); Patrick Kirchner, Aachen (DE); Andreas Meckbach, Erkelenz (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 387 days.

(21) Appl. No.: 15/305,833

(22) PCT Filed: Nov. 10, 2015

(86) PCT No.: PCT/EP2015/076116
§ 371 (c)(1),
(2) Date: Oct. 21, 2016

(87) PCT Pub. No.: WO2016/107691
PCT Pub. Date: Jul. 7, 2016

(65) Prior Publication Data
US 2017/0087762 A1   Mar. 30, 2017

(30) Foreign Application Priority Data
Dec. 30, 2014 (DE) .......................... 10 2014 119 700

(51) Int. Cl.
*B29C 65/36* (2006.01)
*B29C 65/00* (2006.01)
(Continued)

(52) U.S. Cl.
CPC ........ *B29C 65/3656* (2013.01); *B29C 65/368* (2013.01); *B29C 65/3668* (2013.01);
(Continued)

(58) Field of Classification Search
CPC ............ B29C 65/3656; B29C 66/4326; B29C 66/1122; B29C 66/91651; B29C 65/787;
(Continued)

(56) References Cited

U.S. PATENT DOCUMENTS 3,052,340 A * 9/1962 Lyons ..................... B65B 43/52
198/633
5,809,743 A * 9/1998 Ylonen ................. B65B 51/144
493/133
(Continued)

FOREIGN PATENT DOCUMENTS

CN      1968854 A    5/2007
CN    101360364 A    2/2009
(Continued)

*Primary Examiner* — Christopher T Schatz
*Assistant Examiner* — Cynthia L Schaller
(74) *Attorney, Agent, or Firm* — The Webb Law Firm

(57) ABSTRACT

A device and method for inductively heating package sleeves including: at least one unit for producing an alternating current, at least one inductor having at least one effective section, and a holding unit having a front holding area and a rear holding area for mounting the inductor, wherein the inductor is connected to the unit for producing an alternating current, and wherein the holding areas arranged in such a way that a gap is formed between the front holding area and the rear holding area, the longitudinal direction of which gap corresponds to the conveying direction of the package sleeves. The effective sections of the at least one inductor may be at least in sections arranged asymmetrically to one another in relation to a center plane lying in the gap.

14 Claims, 16 Drawing Sheets

(51) Int. Cl.
  *B65B 51/22* (2006.01)
  *B29C 65/78* (2006.01)
  *B29K 705/02* (2006.01)
  *B31B 50/64* (2017.01)
  *B29L 31/00* (2006.01)
(52) U.S. Cl.
  CPC ........ *B29C 65/787* (2013.01); *B29C 66/1122* (2013.01); *B29C 66/4326* (2013.01); *B29C 66/43122* (2013.01); *B29C 66/72321* (2013.01); *B29C 66/72328* (2013.01); *B29C 66/73921* (2013.01); *B29C 66/81811* (2013.01); *B29C 66/836* (2013.01); *B29C 66/91651* (2013.01); *B65B 51/227* (2013.01); *B29K 2705/02* (2013.01); *B29L 2031/712* (2013.01); *B31B 50/64* (2017.08)
(58) Field of Classification Search
  CPC ............. B29C 66/81811; B29C 66/836; B29C 65/3668; B29C 66/73921; B29C 66/72328; B29C 66/72321; B29C 66/43122; B29C 65/368; B65B 51/227; B29L 2031/712; B31B 50/64; B29K 2705/02
  See application file for complete search history.

(56) References Cited

U.S. PATENT DOCUMENTS

| | | | |
|---|---|---|---|
| 6,764,576 | B1 | 7/2004 | Heinonen et al. |
| 7,638,742 | B2 | 12/2009 | Andersson et al. |
| 8,360,125 | B2 * | 1/2013 | Schwiese ............ B29C 65/3656 |
| | | | 156/379.6 |
| 9,492,858 | B2 | 11/2016 | Pasquale et al. |
| 2010/0180545 | A1 | 7/2010 | Palmquist et al. |
| 2016/0059480 | A1 | 3/2016 | Bierlein et al. |
| 2017/0182702 | A1 * | 6/2017 | Mach ................ B29C 66/91651 |

FOREIGN PATENT DOCUMENTS

| | | |
|---|---|---|
| CN | 101711419 A | 5/2010 |
| DE | 69731280 T2 | 3/2006 |
| EP | 0842854 A2 * | 5/1998 |
| JP | 2003155005 A | 5/2003 |
| JP | 2003341628 A | 12/2003 |
| RU | 2474495 C2 | 2/2013 |
| WO | 0044619 A1 | 8/2000 |
| WO | 2012019925 A1 | 2/2012 |
| WO | 2013093505 A2 | 6/2013 |
| WO | 2014166765 A1 | 10/2014 |

* cited by examiner

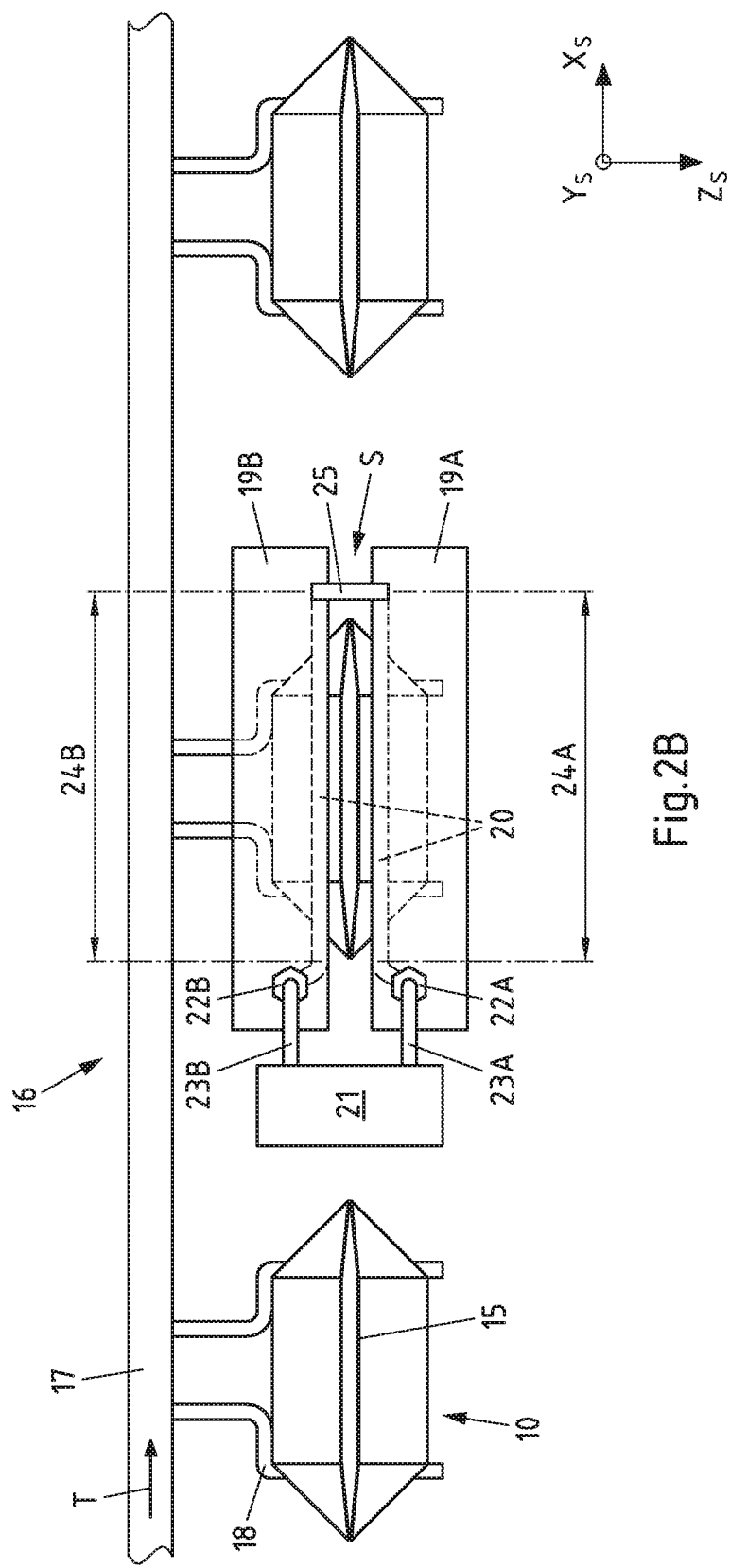

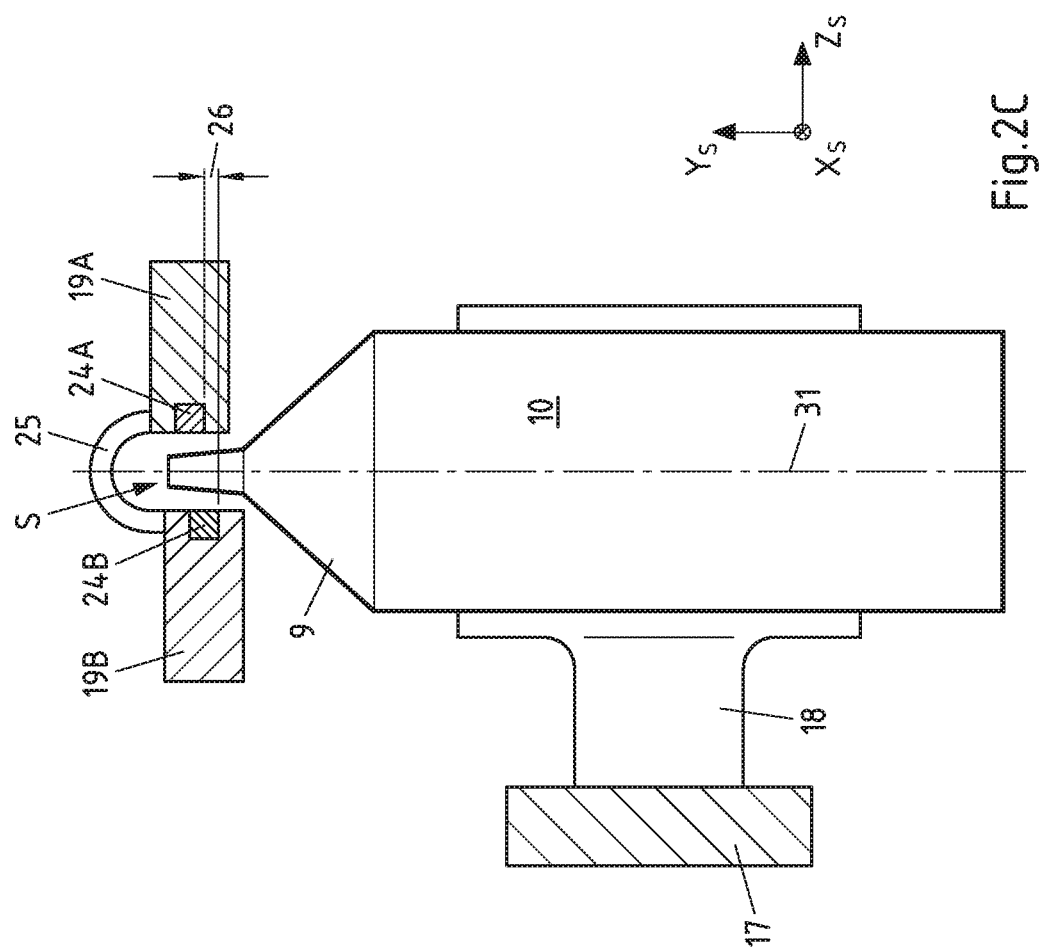

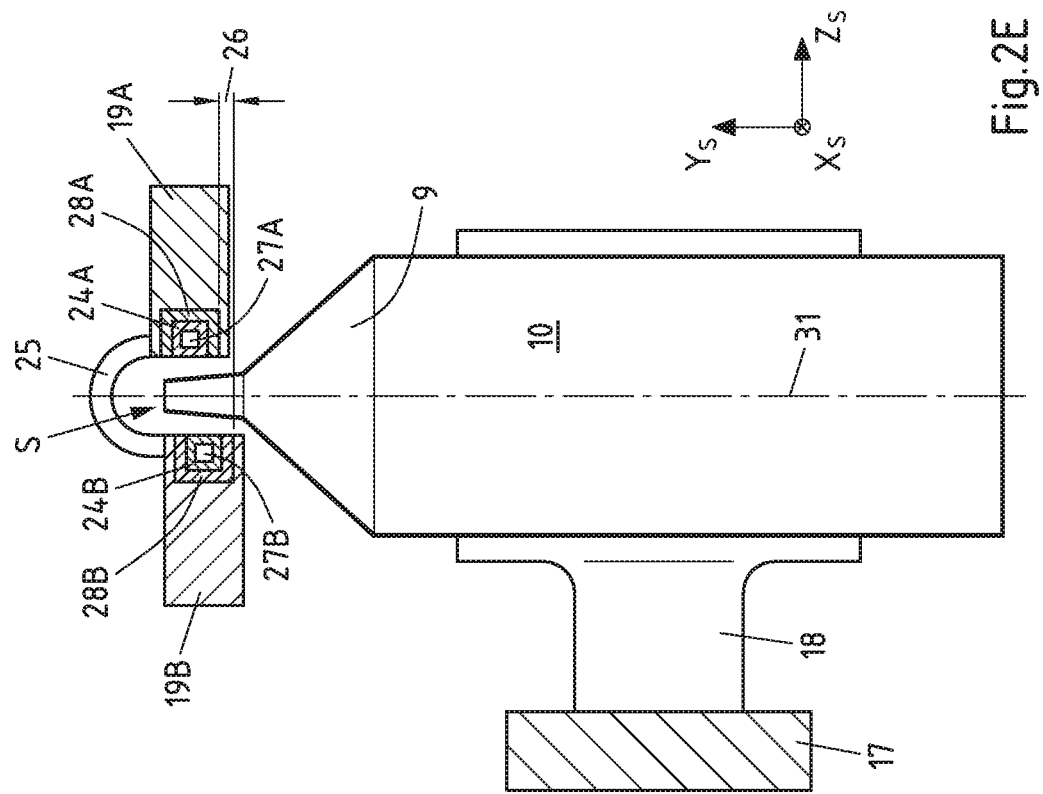
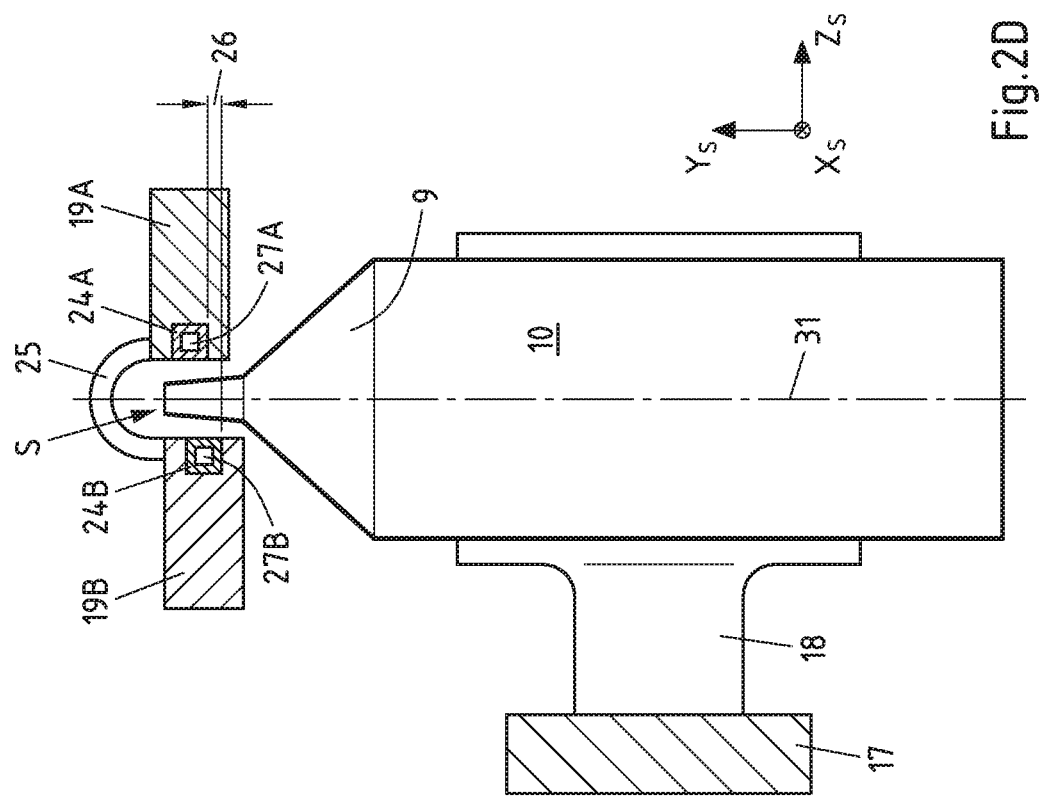

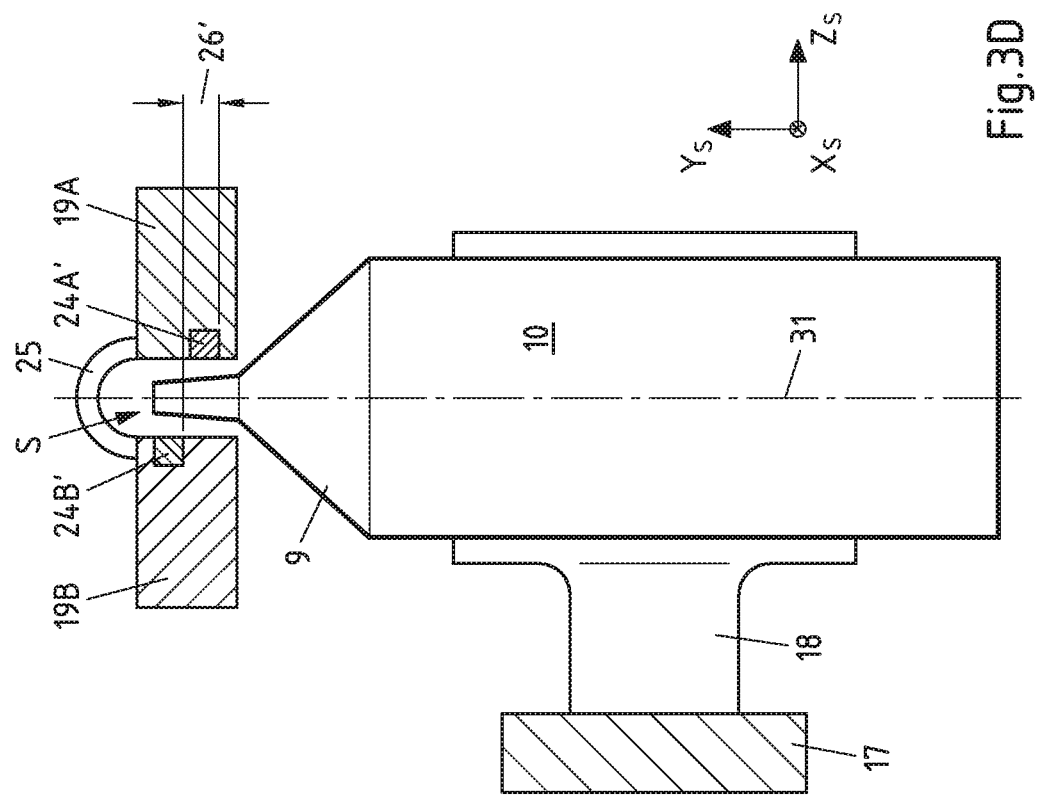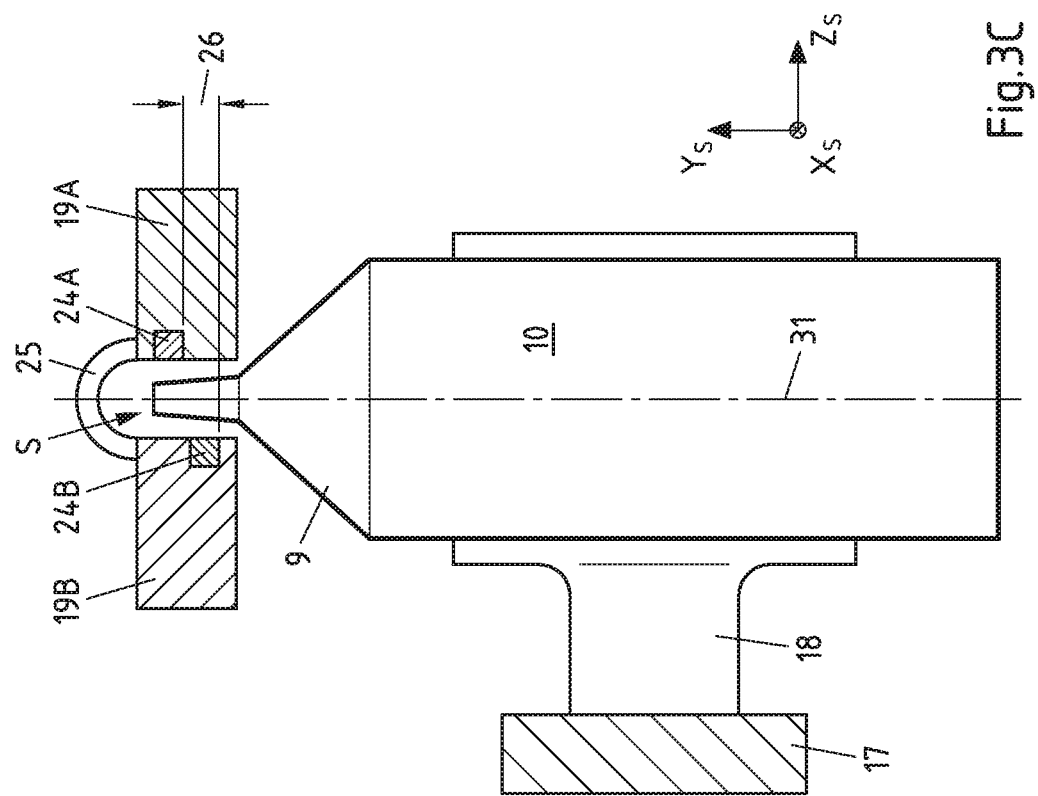

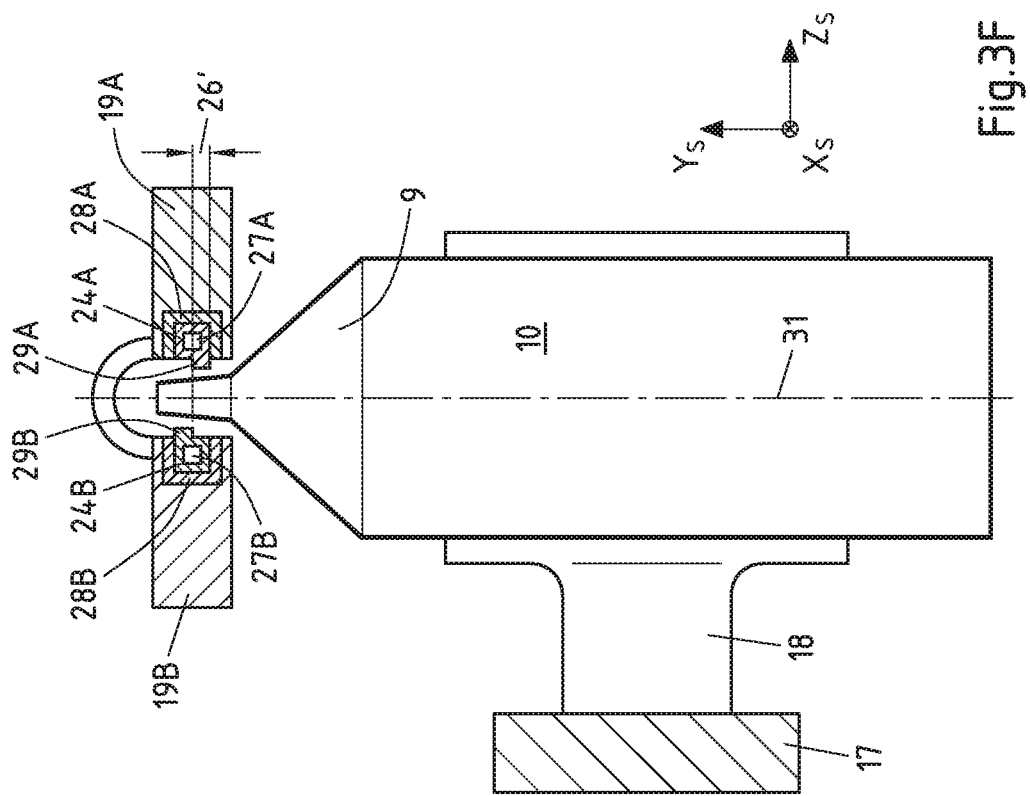
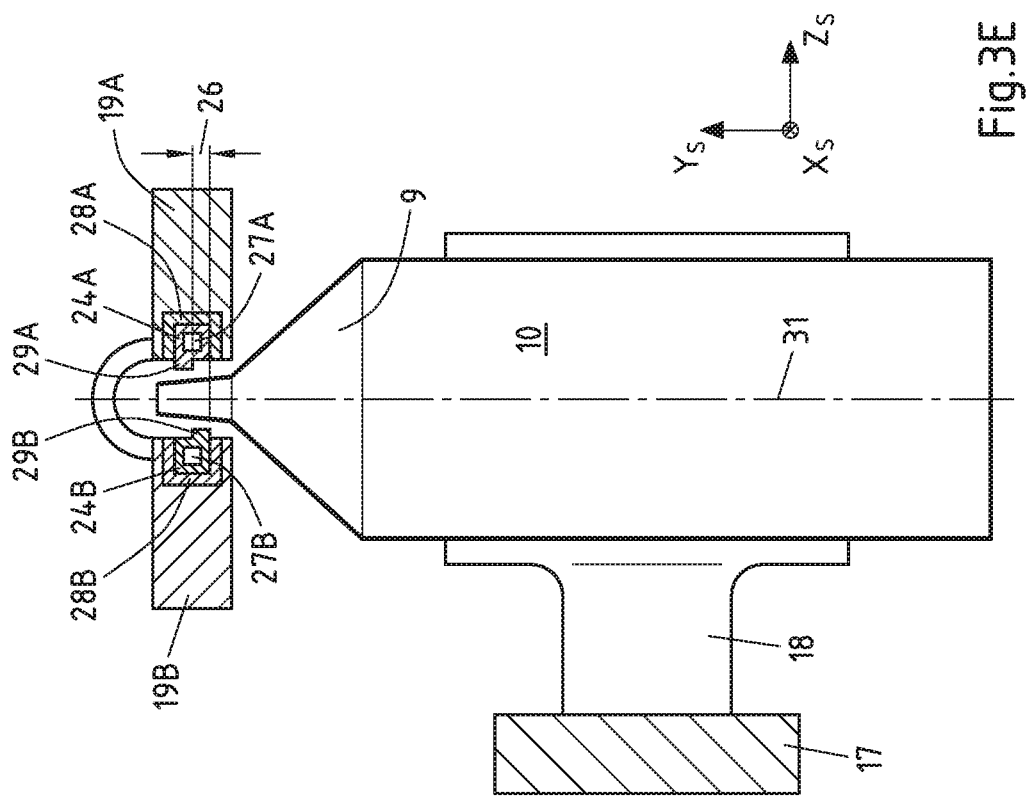

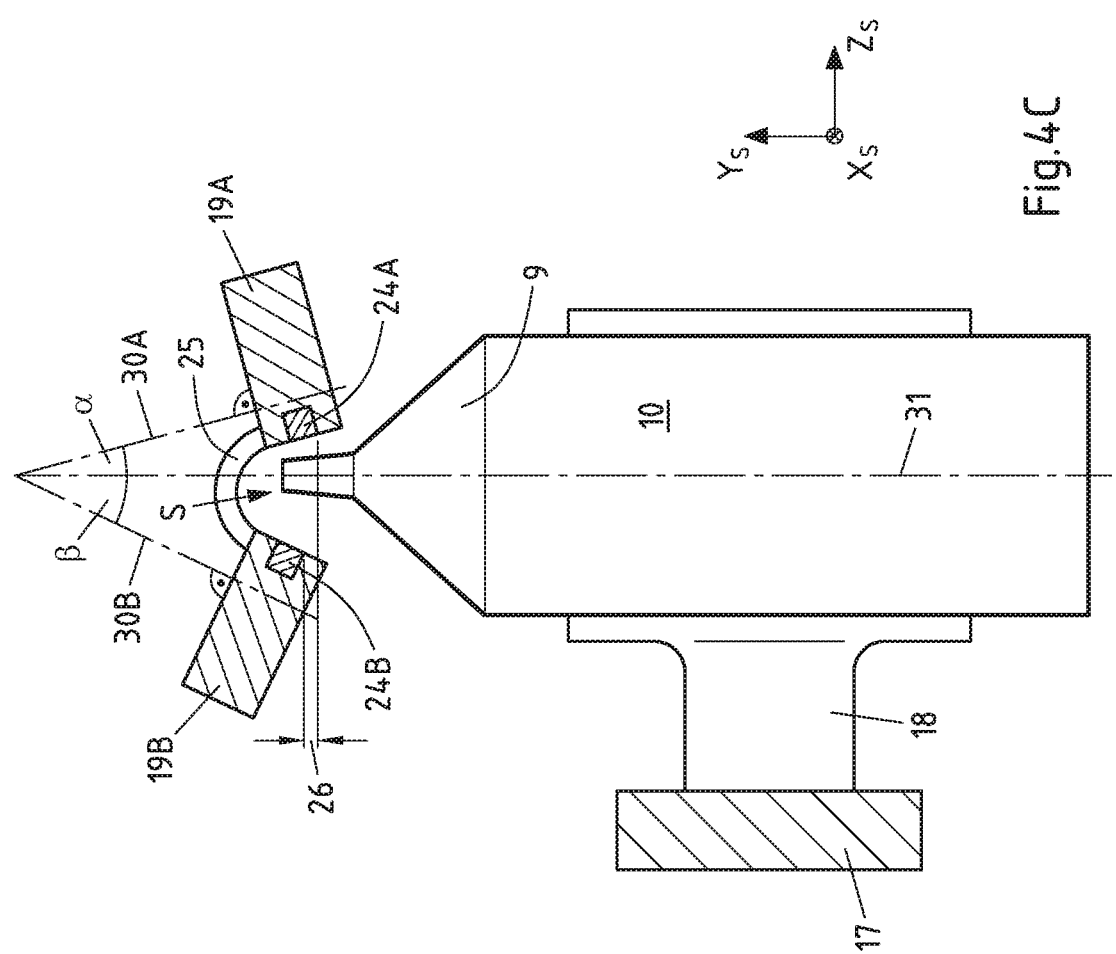

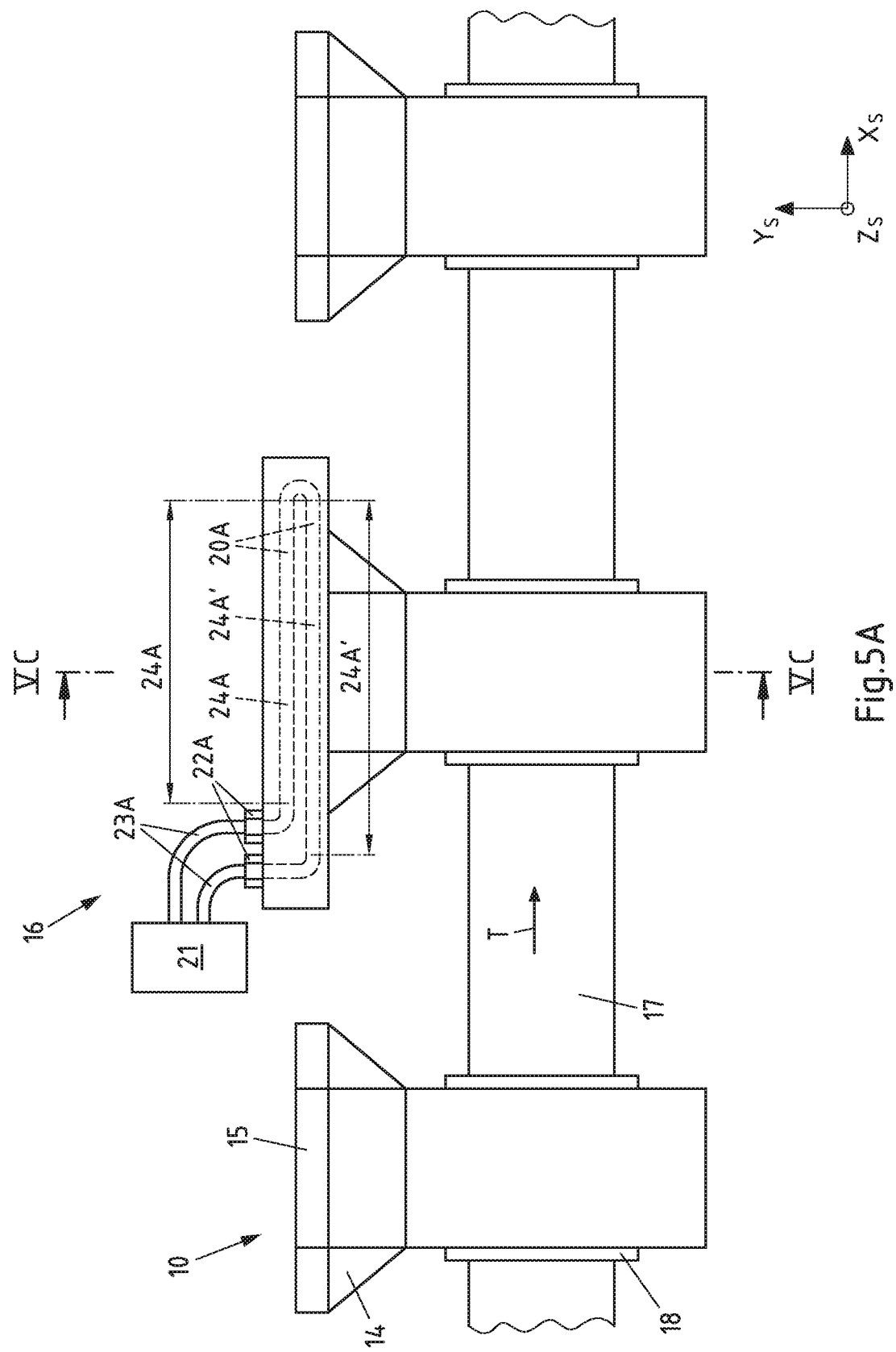

DEVICE AND METHOD FOR INDUCTIVELY HEATING PACKAGE SLEEVES

CROSS-REFERENCE TO RELATED APPLICATIONS

This application is the United States national phase of International Application No. PCT/EP2015/076116 filed Nov. 10, 2015, and claims priority to German Patent Application No. 10 2014 119 700.3 filed Dec. 30, 2014, the disclosures of which are hereby incorporated in their entirety by reference.

The invention relates to a device for inductively heating package sleeves, comprising: at least one unit for producing an alternating current, at least one inductor having at least one effective section, and a holding unit having a front holding area and a rear holding area for mounting the inductor, wherein the inductor is connected to the unit for producing an alternating current, and wherein the holding areas are arranged in such a way that a gap is formed between the front holding area and the rear holding area, the longitudinal direction of which gap corresponds to the conveying direction of the package sleeves.

In addition, the invention relates to a method for inductively heating package sleeves.

BACKGROUND OF THE INVENTION

Packaging can be produced in various ways and from all kinds of materials. A common way of producing packages involves producing a blank from the packaging material, from which by means of folding and other steps firstly a package sleeve and finally a package are formed. The advantage of this production method, amongst other things, is that the blanks are very flat and can therefore be stacked saving space. In this way, the blanks or package sleeves can be produced at a different place than where the folding and filling takes place. Composite materials are often used, for example a composite consisting of a plurality of thin layers of paper, cardboard, plastic or metal, in particular aluminium. Such packages are widely used particularly in the food industry.

In packaging technology, numerous devices and methods are known, by means of which flatly folded together package sleeves can be unfolded, closed on one side, filled with contents and finally fully closed.

Closing the package sleeves presents a particular challenge because this process must produce a reliable sealing of the package sleeves which must also withstand subsequent transport and other stresses and strains. Closing often takes place in two steps: firstly the package sleeve is heated in the area to be closed ("activated") and subsequently the opposing sides of the package sleeve are pressed together in the area to be closed ("compressed"). The cohesion between the compressed areas is, for example, achieved by providing an inner plastic layer which becomes viscous during heating and hence brings about adhesion during the subsequent compression. This process is also referred to as "sealing".

The activation—i.e. heating—of the package sleeves can, for example, be effected by the use of hot air. The advantage of this is that package sleeves consisting of all materials can be heated. In addition, a hot-air blower is very robust. However, the disadvantage is the very high energy requirement, as a result of which the production costs increase considerably.

Alternatively to this, the package sleeves can be activated or heated by means of electromagnetic induction. Inductive heating constitutes a method, in which electrically conductive bodies are heated by eddy current losses which occur in the conductive bodies. For this purpose, an alternating current is conducted through a conductor (the inductor), wherein an alternating magnetic field forms in the surrounding area of the conductor and has an effect on the body to be heated. An eddy current forms in the body to be heated through the alternating magnetic field and the eddy current losses lead to the body being heated.

A change in the magnetic flux density thus leads to the formation of an electrical field which in turn leads to a current flow.

Therefore, a prerequisite for applying this method is for the package sleeves to have electrically conductive areas. Many package sleeves in any case have a layer consisting of metal, in particular consisting of aluminium, since the package contents can be shielded particularly well from light and oxygen by this means. Therefore, such package sleeves can be heated by induction. A layer consisting of an electrically conductive plastic material could likewise be heated by induction. Although the induction initially only causes the electrically conductive layer to be heated, by means of heat conduction and a corresponding arrangement of the layers the inner plastic layer responsible for the adhesion can also be indirectly heated. An advantage of inductive heating is that the heat forms directly in the electrically conductive area and—different from heating by means of hot air—does not have to be transferred by heat conduction. This results in a high level of efficiency, so that the energy requirement and the costs can be kept low. In addition, the amount of heat output can be very precisely controlled.

A device for inductive sealing is known from WO 2014/166765 A1, for example.

A further device for sealing package sleeves is known from WO 00/44619 A1. With this device, the package sleeves to be closed are conveyed in cassettes which are attached to a conveyor belt. The cassettes are designed in such a way that the areas of the package sleeves to be closed jut out from the cassettes on their upper sides and on their undersides. The undersides of the package sleeves are firstly conveyed through a forming station with two opposing rails, by means of which the undersides of the package sleeves are pressed together. Then, the undersides of the package sleeves are conveyed through a sealing device, in which the package sleeves are inductively heated. Following this, the undersides of the package sleeves are firstly conveyed through a compression device and then through a support device. Both the compression device and the support device comprise opposing rollers, between which the undersides of the package sleeves are pressed together.

Inductive heating is effected according to the teaching of WO 00/44619 A1 by conveying the package sleeves with their areas to be heated through a gap in the sealing device. On both sides of the gap, an inductor is arranged having two parallel conductors in each case, so that a mirror-symmetrical structure is produced (cf. FIG. 5 of WO 00/44619 A1). A cooling channel is arranged next to each conductor. A disadvantage of this solution is the large amount of effort required in terms of design for a plurality of inductors with a plurality of conductors and the associated costs. The symmetrical arrangement of the conductors can also—depending on the direction of the current flows—lead to further disadvantages. In the case of opposed flow directions on both sides of the gap the electromagnetic fields of the right or front inductor and of the left or rear inductor superpose one another in such a way that although the magnetic field is strengthened in the area of the gap, the magnetic field lines run predominantly in the vertical direction in the area of the gap and hence parallel to the areas of the package sleeve to be heated. However, for the induction of eddy currents, field lines running perpendicularly to these areas are required. With identical flow directions on both sides of the gap the magnetic field would, by contrast, weaken in the area of the gap.

SUMMARY OF THE INVENTION

Against this background, the invention is based on the object of developing and refining a device, described in the introduction and previously explained in more detail, such that with a simple structural design an improved superposition of the electromagnetic fields can be obtained and hence more efficient inductive heating.

This object is achieved with a device according to the preamble of Claim 1 by the effective sections of the inductor are at least in sections arranged asymmetrically to one another in relation to a centre plane lying in the gap.

A device according to the invention serves the purpose of inductively heating package sleeves or sections thereof. These package sleeves can in particular be individual—i.e. already separated from one another—and pre-folded package sleeves having a layer consisting of a conductive material, such as aluminium. The device is firstly characterised by at least one unit for producing an alternating current. Inductive heating requires a change in a magnetic field, for which purpose an alternating current is ideal. The device—and in particular the unit for producing an alternating current—also comprises at least one inductor having at least one effective section. Preferably, however, an inductor having at least two effective sections is present. An effective section is understood as that section of the inductor which is to produce eddy currents in the package sleeve by means of its alternating electromagnetic field. The effective sections are preferably formed roughly linearly and arranged very close to the package sleeves which are conveyed past. Preferably, the effective sections are exposed on their side facing the package sleeves or only have a very thin coating on this side (e.g. under 1 mm) which blocks off or scatters the electromagnetic field as little as possible. Furthermore, the device comprises a holding unit having a front holding area and a rear holding area for mounting the inductor. The holding unit can be formed in one piece or in a plurality of pieces and its holding areas are preferably elongated in form, so that their dimensions in the longitudinal direction are greater than their dimensions in the transverse direction and/or in the vertical direction. The inductor can, for example, be mounted in or on the holding unit by the inductor being in any case partly enclosed by the material of the holding unit. However, in one simple case, the holding unit can also merely consist of at least one electric cable or a cable conduit, to which the at least one inductor is attached, for example suspended. The inductor is connected to the unit for producing an alternating current, by which in particular an electrically conductive connection via cables, wires or suchlike is understood. The holding areas are arranged in such a way that a gap is formed between the front holding area and the rear holding area, the longitudinal direction of which gap corresponds to the conveying direction of the package sleeves. As a result of this arrangement, the effective sections of the inductor can also be arranged on both sides, i.e. in front of the package sleeve and behind the package sleeve. This serves the purpose of being able to convey the package sleeves with their areas to be heated through the gap without them having to be stopped.

According to the invention, it is proposed that the effective sections of the inductor are at least in sections arranged asymmetrically to one another in relation to a centre plane lying in the gap. The centre plane is in particular understood as a plane which runs in the conveying direction through the gap and—in any case with rectangular packages—lies in the centre between the front surface and the rear surface of the package sleeve and is arranged parallel to these two surfaces. The centre plane preferably runs vertically. The effective sections of the inductor should be at least in sections or even continuously arranged asymmetrically in relation to this centre plane. It is particularly advantageous if the effective sections of the at least one inductor are arranged on both sides of the centre plane and in such a way that at least one part of the electromagnetic field lines produced by them interact with one another. As a result, among other things, the uniformity of the activation to be produced in the packaging material can be increased. So-called "hot spots" are thus particularly effectively prevented. In particular, the effective section or the effective sections on the one side of the gap should not be arranged mirror-symmetrically to the effective section or the effective sections on the other side of the gap. Surprisingly, tests have shown that an asymmetrical arrangement of the effective sections of the inductor results in a considerable increase in the temperatures that can be achieved with otherwise identical operating parameters. This is attributed to the fact that with an asymmetrical arrangement the electromagnetic fields produced on both sides of the gap superpose one another in a way which is more favourable for inductive heating. This is a particularly big advantage if there is only one single inductor which runs in the conveying direction on the one side of the gap, then bridges the gap and finally runs back contrary to the conveying direction on the other side of the gap. In this case, the current directions run in opposite directions on both sides of the gap, which affects the "directions" of the field lines: with the symmetrical arrangement the field lines of the right or front effective section and of the left or rear effective section would superpose one another in such a way that although the magnetic field is strengthened in the area of the gap, the field lines run predominantly in the vertical direction in the area of the gap and hence parallel to the areas of the package sleeve to be heated. However, for the induction of eddy currents, field lines running perpendicularly to these areas are required, i.e. field lines which "pierce through" the areas to be heated. It is these field lines—which are necessary for the heating to take place—which would largely eliminate one another with a symmetrical arrangement. With an arrangement of the inductors according to the invention, by contrast, the field lines run obliquely in the area of the gap; the field lines therefore also contain direction components which run perpendicular to the areas of the package sleeve to be heated. Therefore, an arrangement of the effective sections of the inductor according to the invention can make the heating of the package sleeves substantially more efficient in a simple way in terms of design. The asymmetrical arrangement can, for example, be realised by means of a height offset between the opposing effective sections of the inductor.

According to one embodiment of the device, provision is made for the front holding area and the rear holding area to be respectively assigned to at least one effective section of the inductor. By assigning at least one effective section to each holding area, it is ensured that an effective section, and hence an electromagnetic field, is present on each side of the gap. One effective section per holding area with a sufficient length is sufficient to be able to reliably heat the package sleeve; nevertheless, a plurality of effective sections per holding area can be provided. Preferably, the effective sections are effective sections of the same inductor.

This embodiment can be advantageously developed further by a height offset which is provided between the front effective section and the rear effective section of the inductor. An asymmetrical structure can be obtained in a simple way in terms of design by means of a height offset, i.e. an arrangement with different heights. A height offset can be accomplished, for example, by the front holding area and the rear holding area of the holding unit being arranged with different heights. A height offset can also be accomplished with an arrangement where both holding areas have the same height by the two effective sections of the inductor being mounted at different heights in or on the holding area. A height offset can also be accomplished using different shapes, in particular by different cross-sectional areas of the effective sections.

It is additionally proposed for this embodiment that the height offset is in the range between 0.5 mm and 10 mm, in particular in the range between 2 mm and 4 mm. An offset in the specified range takes into account both the greatest possible change in the electromagnetic fields (greatest possible height offset) and a limited height of the areas to be heated (smallest possible height offset).

In a further embodiment of the device, provision is made for the effective sections of the inductor to be formed linearly and run parallel to the conveying direction of the package sleeves. This design and arrangement of the effective sections enables the effective sections to be arranged particularly close to the package sleeves to be heated, since the areas of the package sleeves to be heated are also predominantly plane and are conveyed along the conveying direction. The package sleeves can be inductively heated particularly efficiently by having a narrow distance between the effective sections of the inductor and the package sleeves, since the field strength decreases with increasing distance.

According to a further embodiment of the device, it is proposed that at least one inductor has a bridge for bridging the gap. A bridge enables an inductor to extend over both sides of the gap without it forming an obstacle for the package sleeves conveyed through the gap. For example, an inductor can be provided with two effective sections, one effective section of which is arranged on the front side of the gap and the other effective section of which is arranged on the rear side of the gap. The bridge is preferably manufactured from a material with good electrical conductivity, such as copper, brass, silver, beryllium or suchlike. This material can be the same material as the material of the effective sections of the inductor; this simplifies the connection, in particular the soldering, and prevents problems such as contact corrosion. If a plurality of inductors are provided, a plurality of bridges can also be provided.

According to a further embodiment of the device, it is proposed that at least one effective section of the inductor is formed as a hollow profile having an integrated cooling channel. Preferably, all effective sections of the inductor are formed as hollow profiles having integrated cooling channels. The hollow profile can, for example, be a rectangular in particular a square, four-sided profile or also a hollow profile with a circular cross-section. This formation of the effective sections has the particular advantage that no separate cooling channels have to be provided next to the effective sections. Instead, the hollow space in the hollow profile, which is available anyway, is used to dissipate heat. The heat can be dissipated by air or—in order to obtain a higher cooling capability—by liquids such as water or oil. A further advantage of this formation is that the outer dimensions of the effective sections of the inductor hardly have to be increased or do not have to be increased at all compared to a solid design. This is because with conductors which alternating currents flow through the highest current density is to be found in the outer cross-sectional areas of the conductors anyway, while the middle cross-sectional areas do not make a big contribution to the current flow (so-called "skin-effect").

A further embodiment of the device makes provision for at least one effective section of the inductor to be enclosed by a concentrator. Preferably all effective sections of the inductor are enclosed by concentrators. It is preferred if the effective section is only partly enclosed by the concentrator. A concentrator is understood as a means for concentrating the magnetic field. Preferably, the concentrator is manufactured from a magneto-dielectric material, i.e. from a material which has both ferromagnetic and dielectric properties. For example, this can be a thermoplastic synthetic material, into which soft iron particles are uniformly embedded. The advantage of the use of concentrators is that the magnetic field can be concentrated in a targeted way on the desired area, i.e. the areas of the package sleeve to be heated. On the one hand, this results in the package sleeves to be heated being very efficiently and precisely heated and, on the other hand, prevents strong magnetic fields in the surrounding area. A further advantage is that the magnetic fields penetrate more deeply into the package sleeve. This is particularly important where there are greater material thicknesses, so as to ensure that the heating is sufficient (e.g. a material overlap in a seam area of the package sleeve).

According to a further embodiment of the device, provision is made for at least one effective section of the inductor to have a protrusion. Preferably, all effective sections of the inductor have a protrusion. The current flow, and hence the electromagnetic field too, can be particularly closely and precisely guided to the places of the package sleeve to be heated and hence concentrated. This can be utilised, for example, to reduce the areas of the package sleeve to be heated, in order to increase the packaging material yield. This effect can be augmented particularly through the use of an above described and correspondingly formed concentrator. The position and the shape of the protrusion can be constant or vary over the length of the effective section of the inductor.

A further embodiment of the device makes provision for at least one holding area to be inclined by an angle in the range between 5° and 30°, in particular between 10° and 25°, with respect to the centre plane. An asymmetrical arrangement of the effective sections of the inductor can also be achieved by inclining the holding areas, provided that both holding areas are not inclined to the same degree. An advantage of inclining the holding areas is that the areas of the package sleeves to be heated in this stage also typically do not run vertically but are slightly inclined. The inclination of the holding areas therefore allows the position of the effective sections of the inductor to be adapted to the shape and position of the areas of the packaging sleeves to be heated. In addition, different material thicknesses of the package sleeves can be adapted to by inclining the holding areas differently. The cause of different material thicknesses can, for example, be due to the fact that the package sleeves on one side have a seam with a material overlap, while the other side has no such irregularities.

A further embodiment of the device is characterised by at least two inductors, wherein each inductor is connected to a unit for producing an alternating current. Due to the fact that a plurality of separate inductors and hence separate circuits are present, it is possible to set the operating parameters individually for each of the inductors (voltage, frequency, etc.). Alternatively, however, in the case of a plurality of inductors, provision can be made for all inductors to be connected to the same unit for producing an alternating current and therefore to be operated using the same operating parameters.

The inductor can be manufactured from an electrical conductor such as copper, brass or beryllium. If a plurality of inductors are present, preferably all inductors are manufactured from copper, brass or beryllium. Copper and brass are characterised by a very good electrical conductivity. They can also be formed well. Where the electrical conductivity requirements are particularly high, silver can also be used as a material despite the high cost.

A conveyor belt with cells for receiving the package sleeves can be added to the device. High tractive forces can be transferred by means of a conveyor belt, which allow a large number of package sleeves at constant distances in relation to one another to be conveyed. The cells serve for receiving the package sleeves. The package sleeves can be held in the cells both by means of a form-fit connection and by means of a force-fit connection. Provision can be made for the conveyor belt to be arranged to convey the package sleeves continuously. The advantage of this is that the package sleeves are moved uniformly and without interruption. Alternatively, the conveyor belt can be arranged to convey the package sleeves discontinuously. The advantage of this is that some processing steps can be carried out more easily when the package sleeves are stationary.

Alternatively or additionally, a guiding mechanism for conditioning the gable geometry of the package sleeves can be added to the device. The guiding mechanism can be arranged upstream and/or downstream of the holding areas in the conveying direction. Arranging the guiding mechanism upstream of the holding areas serves to condition the gable geometry, so as to improve the repeat accuracy of the activation process. Arranging the guiding mechanism downstream of the holding areas, on the other hand, serves to prepare for subsequent processes and to lower the risk of contamination by a reduction in the open gable area. In order to be able to provide process parameters for the processing step following the activation—the compression step—a guiding mechanism is to be provided, by means of which a defined space between the sealing surfaces of the package gable can be set. The size of this space can, for example, correspond to the space between the two sealing surfaces when leaving the gap between the holding areas of the device. However, it can also be desirable if this space is slightly increased or decreased during passage through the guiding device. In the latter case, it is advantageous if the inner surfaces to be joined together are already brought closer to one another. In order to prevent the inner surfaces from being stuck together prematurely and unintentionally, it can, however, also make sense, depending on how large the gap distance was beforehand, to initially allow a slight distance between the surfaces to be joined. It is assumed that the surfaces to be joined, due to the stresses introduced by the preceding folding and sealing processes into the package which is still open, attempt to move away from one another, so as to be able to relieve stress. It is important that the respective contact surface is large enough and does not have any sharp edges. It is also advantageous if the guiding surfaces coming into contact with the outside of the package have a non-stick coating and/or an anti-friction coating, for example consisting of PFA (perfluoroalkoxy polymers) or PTFE (polytetrafluoroethylene). This also prevents possible deposits on the guiding surfaces, in case occasional abrasion or removal of package material should still occur, which is important for the treatment of subsequent packages. The length of the guiding mechanism in the direction of movement of the packages should, depending on the actual process parameters, such as package material, production rate, distance between the sealing surfaces, activation temperature and ambient temperature, amongst others, be between 0.2 to 2.5 times the lateral length of the package to be treated by the device. This enables a maturing of the activated sealing surfaces to be joined together or of the material layers forming them to already take place which has a positive effect on the quality of the subsequent sealing seam.

The object described at the outset is also achieved by a method for inductively heating package sleeves. The method comprises the following steps: a) providing a device for inductively heating package sleeves having at least one inductor having at least one effective section; b) providing package sleeves with an electrically conductive area; and c) producing an alternating electromagnetic field. The method is characterised in that the alternating electromagnetic field is produced by effective sections of the inductor which are arranged asymmetrically to one another in relation to a centre plane lying in the gap.

As has already previously been described in connection with the device, the method is also based on the idea of superposing the electromagnetic fields of the effective sections of the inductor in an ideal way for inductive heating. This can be achieved by arranging the effective sections asymmetrically, i.e. not mirror-symmetrically, in relation to the centre plane.

One embodiment of the method makes provision for a device according to any one of Claims 1 to 13 to be provided in step a). The previously described device is particularly suitable for carrying out the method in all the presented embodiments, since the asymmetrical arrangement of the effective sections of the inductor constitutes a simple way in terms of design to achieve the most favourable superposition of the electromagnetic fields of the effective sections possible.

In a further embodiment of the method, it is proposed that a direct current voltage with a voltage in the range between 20 V and 1000 V, in particular between 120 V and 280 V, is used in order to produce the alternating electromagnetic field. With direct current voltages in the specified ranges, particularly good results were obtained when inductively heating package sleeves having a thin aluminium layer.

According to a further embodiment of the method, provision is made for an alternating electromagnetic field with a frequency in the range between 30 kHz and 2000 kHz, in particular between 100 kHz and 500 kHz, preferably between 100 kHz and 250 kHz, to be produced. With frequencies in the specified ranges, particularly good results were obtained when inductively heating package sleeves having a thin aluminium layer. The direct current voltage can be applied to a resonant circuit consisting of at least one capacitor and at least one inductor.

Finally, the following step can be added to the method: d) moving the package sleeves relative to the device. In particular, provision can be made for the package sleeves to be moved through the gap of the fixed device. The advantage of this step is that the package sleeves do not need to be stopped during the inductive heating. Therefore, the package sleeves can also be conveyed continuously without interruption during heating. The movement of the package sleeves has only a very slight effect on the electromagnetic fields of the device, since the amount of relative speed between the package sleeves and the device in comparison to the high frequency changes in the electromagnetic fields is negligibly small.

BRIEF DESCRIPTION OF THE DRAWINGS

The invention is explained in more detail below with the aid of the figures illustrating just one preferred exemplary embodiment.

FIG. 2B shows the device from FIG. 2A in a plan view, FIG. 2C shows the device from FIG. 2A in a sectional view along the plane IIC-IIC from FIG. 2A, FIG. 2D shows an alternative embodiment to FIG. 2C, FIG. 2E shows a further alternative embodiment to FIG. 2C, FIG. 3C shows the device from FIG. 3A in a sectional view along the plane IIIC-IIIC from FIG. 3A, FIG. 3D shows the device from FIG. 3A in a sectional view along the plane IIID-IIID from FIG. 3A, FIG. 3E shows an alternative embodiment to FIG. 3C, FIG. 3F shows an alternative embodiment to FIG. 3D, FIG. 4C shows the device from FIG. 4A in a sectional view along the plane IVC-IVC from FIG. 4A, FIG. 5A shows a fourth embodiment of a device according to the invention in a front view.

DETAILED DESCRIPTION OF THE INVENTION

Figure 1A:
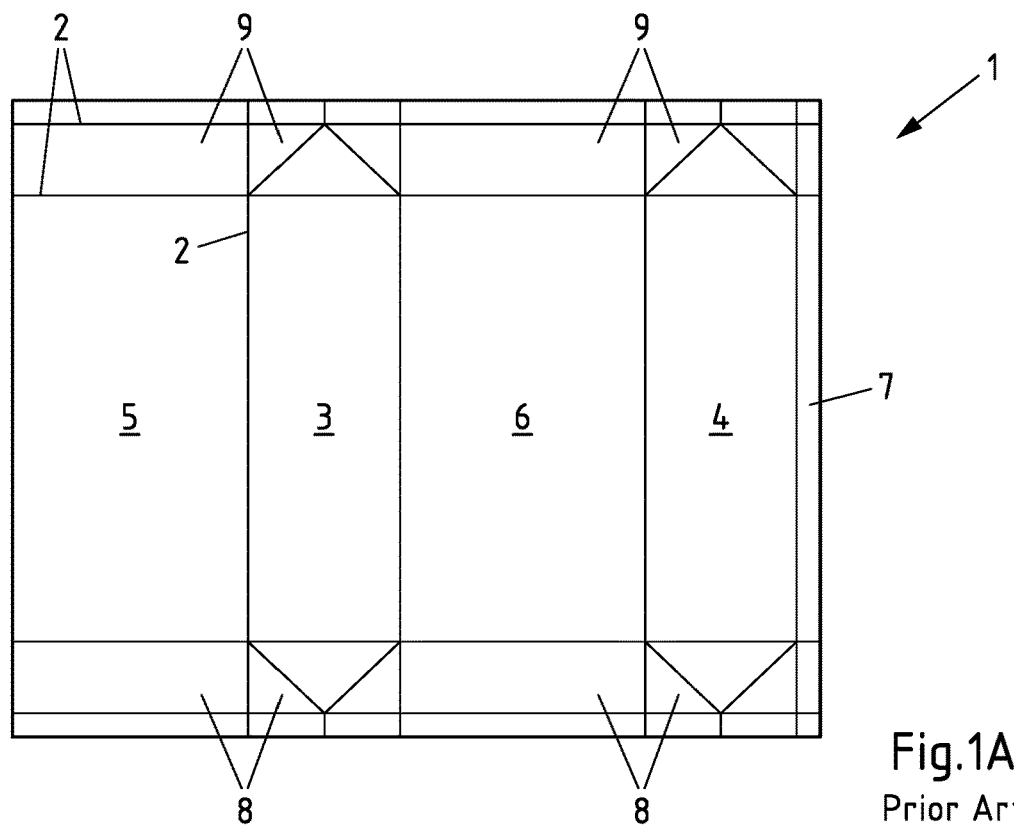
FIG. 1A shows a blank known from the prior art for folding a package sleeve.

A blank 1 known from the prior art is illustrated in FIG. 1A, from which a package sleeve can be formed. The blank 1 can comprise a plurality of layers of different materials, for example paper, cardboard, plastic or metal, in particular aluminium. The blank 1 has a plurality of fold lines 2 which are to make the folding of the blank 1 easier and divide the blank 1 into a plurality of areas. The blank 1 can be subdivided into a first lateral area 3, a second lateral area 4, a front area 5, a rear area 6, a sealing area 7, base areas 8 and gable areas 9. A package sleeve can be formed from the blank 1 by folding the blank 1 in such a way that the sealing area 7 can be joined, in particular welded, to the front area 5.

Figure 1B:
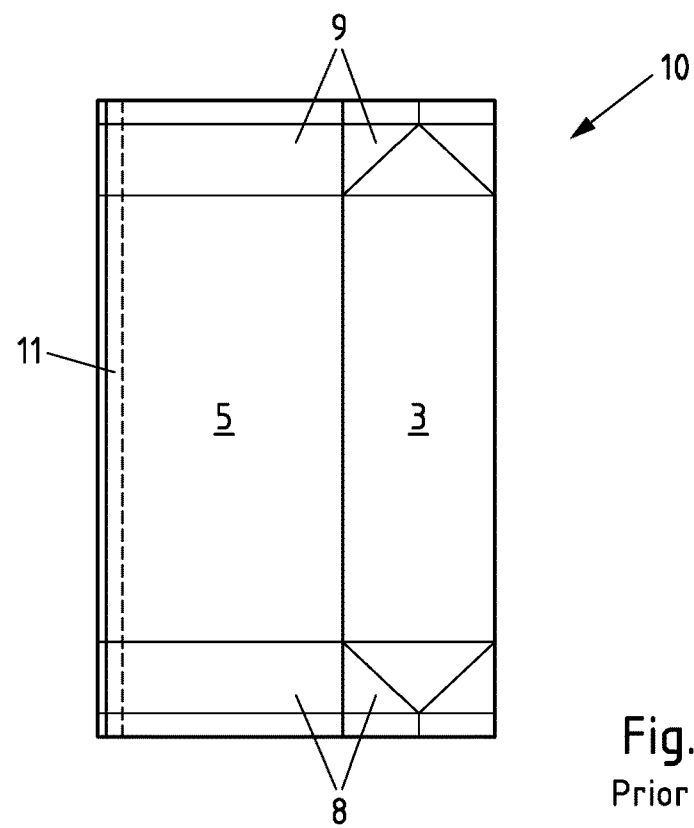
FIG. 1B shows a package sleeve known from the prior art, which is formed from the blank shown in FIG. 1A and is in the folded flat state.

FIG. 1B shows a package sleeve 10 which is known from the prior art and is in the folded flat state. The areas of the package sleeve which have already been described in connection with FIG. 1A are provided with the corresponding reference symbols in FIG. 1B. The package sleeve 10 is formed from the blank 1 shown in FIG. 1A. To that end, the blank 1 was folded in such a way that the sealing area 7 and the front area 5 are overlapping, so that the two areas can be welded together extensively. A longitudinal seam 11 is formed as a result. In FIG. 1B, the package sleeve 10 is shown folded flat together. In this state, one lateral area 4 (hidden in FIG. 1B) lies under the front area 5, while the other lateral area 3 lies on the rear area 6 (hidden in FIG. 1B). In the state where they are folded flat together several package sleeves 10 can be stacked saving a lot of space. Therefore, the package sleeves 10 are often stacked at the place of manufacture and transported in stacks to the place where they are filled. The package sleeves 10 are only then unstacked and unfolded there, so that they can be filled with contents, for example with foodstuffs.

Figure 1C:
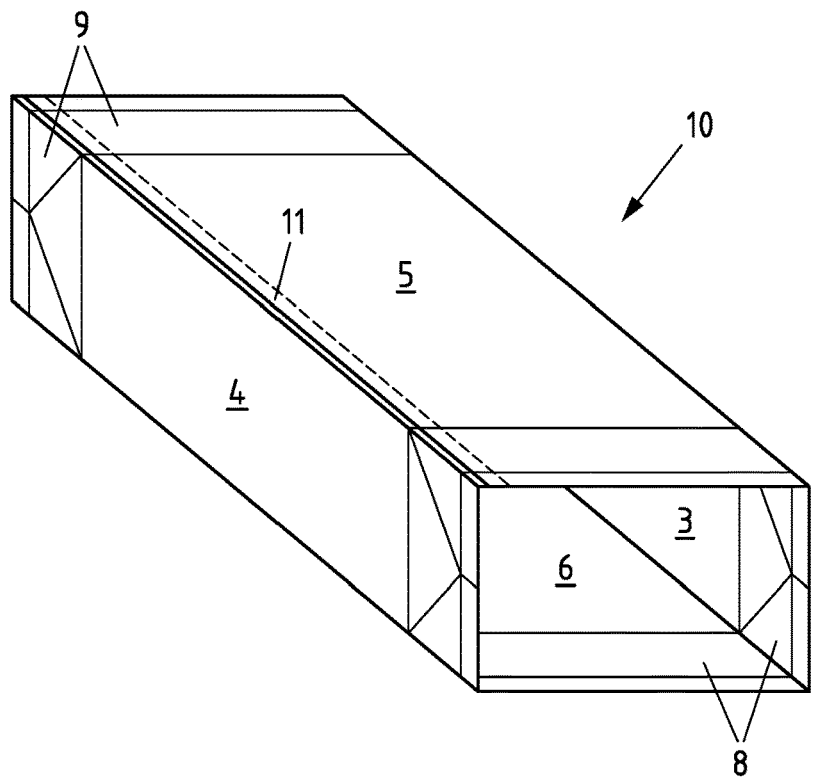
FIG. 1C shows the package sleeve from FIG. 1B, which is in the unfolded state.

In FIG. 1C, the package sleeve 10 from FIG. 1B is illustrated in the unfolded state. The areas of the package sleeve 10 which have already been described in connection with FIG. 1A or FIG. 1B are also provided with the corresponding reference symbols here. A configuration in which an angle of about 90° is formed between the two respectively adjacent areas 3, 4, 5, 6, so that the package sleeve 10—depending on the shape of these areas—has a square or rectangular cross-section, is understood as the unfolded state. Correspondingly, the opposing lateral areas 3, 4 are arranged parallel to one another. The same applies for the front area 5 and the rear area 6. Alternatively to a square or rectangular cross-section, package sleeves having three-sided, six-sided, eight-sided, round or oval cross-sections (not illustrated) can also be produced from correspondingly adapted blanks using correspondingly adapted folding procedures.

Figure 1D:
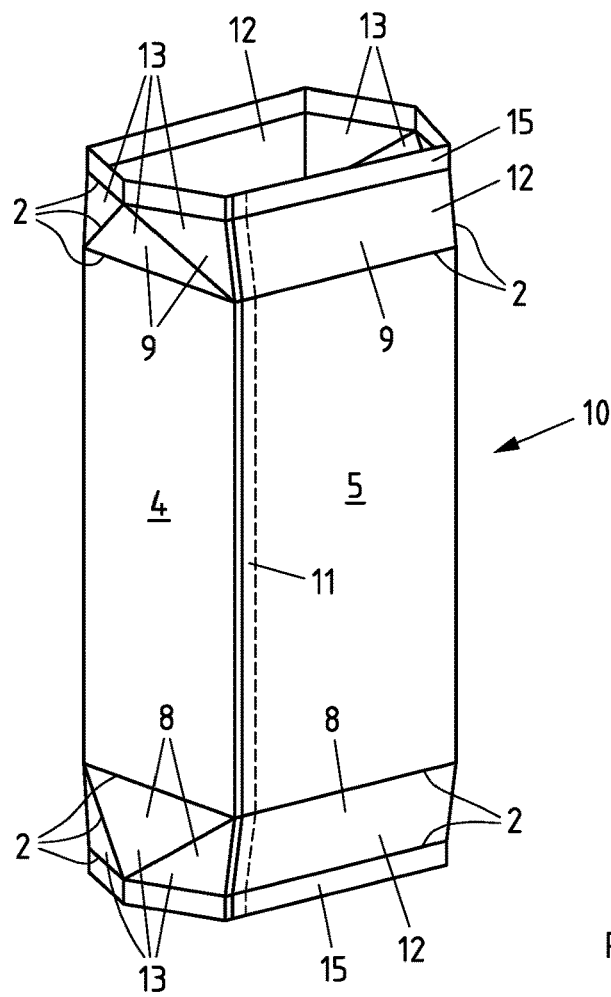
FIG. 1D shows the package sleeve from FIG. 1C with pre-folded base surfaces and gable surfaces.

FIG. 1D shows the package sleeve 10 from FIG. 1C in the pre-folded state, i.e. in a state in which the fold lines 2 have been pre-folded both in the area of the base areas 8 and in the area of the gable areas 9. Those areas of the base areas 8 and the gable areas 9 which abut on the front area 5 and on the rear area 6 are also referred to as rectangular areas 12. During the pre-folding procedure, the rectangular areas 12 are folded inwards and later form the base or the gable of the package. Those areas of the base areas 8 and of the gable areas 9, which abut on the lateral areas 3, 4, are, by contrast, referred to as triangular areas 13. During the pre-folding procedure, the triangular areas 13 are folded outwards and form protruding areas consisting of excess material which are also called "ears" 14 and are flattened on the package in a later production step—for instance by means of a bonding or welding process. The upper sections of the gable areas 9 and the lower sections of the base areas 8 form fin seals 15 after the heating and compression operations; these sections in particular are therefore to be inductively heated by the device described here and by the method described here.

Figure 2A:
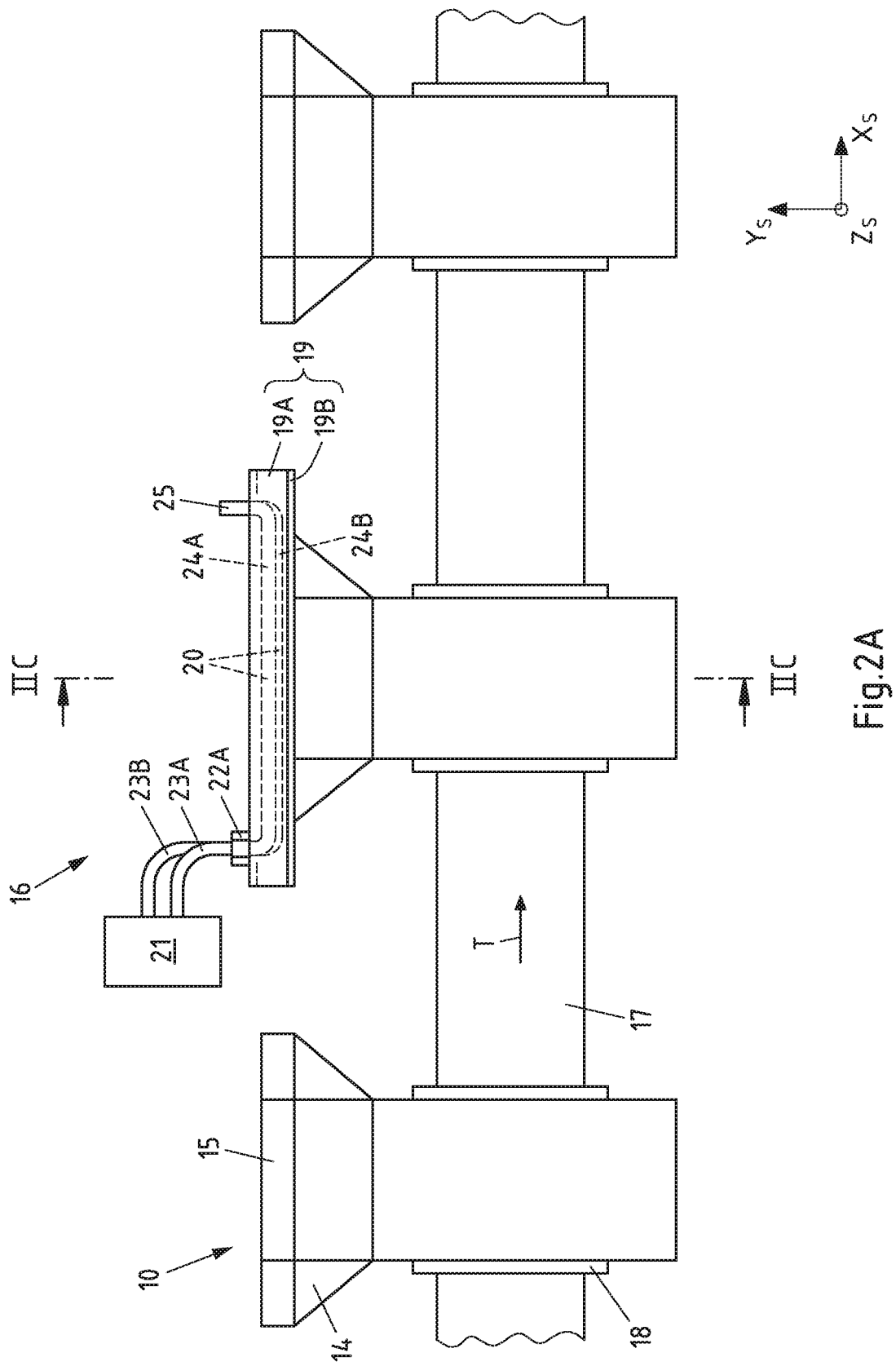
FIG. 2A shows a first embodiment of a device according to the invention in a front view.

FIG. 2A shows a first embodiment of a device 16 according to the invention in a front view. In addition, a conveyor belt 17 is illustrated with cells 18, in which the package sleeves 10 are initially conveyed to the device 16 and transported further after the inductive heating. The conveying direction T of the package sleeves 10 therefore runs parallel to the conveyor belt 17. The device 16 comprises a holding unit 19 having two holding areas 19A, 19B and an inductor 20 which runs through both holding areas 19A, 19B. The holding areas 19A, 19B serve for mounting the inductor 20 and hence determine its position. The device 16 also comprises a holding unit 21 for producing an alternating voltage. The inductor 20 is connected to the unit 21 via connection elements 22A, 22B and cables 23A, 23B. The holding areas 19A, 19B are arranged in such a way that a gap S is formed between the holding areas 19A, 19B, the longitudinal direction $X_S$ of which gap S corresponds to the conveying direction T of the package sleeves 10. The gap S also has a vertical direction $Y_S$ and a transverse direction $Z_S$, which run perpendicular to one another and perpendicular to the longitudinal direction $X_S$ of the gap S (see coordinate system in FIG. 2A). The inductor 20 has two effective sections 24A, 24B which run roughly linearly and the longitudinal directions of which likewise correspond to the conveying direction T of the package sleeves 10. The front effective section 24A is assigned to the front holding area 19A and the rear effective section 24B is assigned to the rear holding area 19B. The two effective sections 24A, 24B of the inductor 20 are connected together by means of a U-shaped bridge 25.

In FIG. 2B, the device from FIG. 2A is illustrated in a plan view. For those areas of the device 16 which have already been described in connection with FIG. 2A, the corresponding reference symbols are also used in FIG. 2B. In the plan view, in particular the outline of the gap S and the connection of the inductor 20 to the unit 21 via the connection elements 22A, 22B and the cables 23A, 23B can be identified. It can also be identified that the inductor 20 extends over both holding areas 19A, 19B via the bridge 25, wherein the front effective section 24A of the inductor 20 is assigned to the front holding area 19A and the rear effective section 24B of the inductor 20 is assigned to the rear holding area 19B. The effective sections 24A, 24B of the inductor 20 are at least 150 mm in length, so that it is ensured that even with high conveying speeds the package sleeves 10 are reliably heated in the area of the fin seals 15. The width of the gap S in the transverse direction $Z_s$ is preferably in the range between 1 mm and 3 mm. These values relate to a device which is designed to process one or more package formats with filling capacities in the range from approximately 80 ml to approximately 2000 ml. In the case of aseptic food packages, nowadays packages with such volumes usually have a material thickness or laminate thickness in the range between 0.1 mm and 1.0 mm.

FIG. 2C shows the device from FIG. 2A in a sectional view along the plane IIC-IIC from FIG. 2A. For those areas of the device 16 which have already been described in connection with FIG. 2A or FIG. 2B, the corresponding reference symbols are also used in FIG. 2C. In the sectional view, it can be clearly identified that although the effective sections 24A, 24B of the inductor 20 are mounted in or on the holding areas 19A, 19B, they are not fully enclosed by the material of the holding areas 19A, 19B. Instead, the effective sections 24A, 24B of the inductor 20 are exposed on the side facing the gap S. In addition, a height offset 26 can be particularly clearly identified which occurs between the front holding area 19A and the rear holding area 19B and hence also between the front effective section 24A and the rear effective section 24B of the inductor 20. The height offset 26 can be in the range between 1 mm and 5 mm. Finally, a center plane 31 is illustrated which runs perpendicularly, i.e. in the direction of the $Y_S$ axis, here.

An alternative embodiment to FIG. 2C is illustrated in FIG. 2D. For those areas of the device 16 which have already been described in connection with FIGS. 2A to 2C, the corresponding reference symbols are also used in FIG. 2D. A difference in this alternative embodiment is that the two effective sections 24A, 24B of the inductor 20 are formed as hollow profiles and have integrated cooling channels 27A, 27B. The cooling channels 27A, 27B can be flowed through by a cooling fluid, for example water or oil, in order to cool the effective sections 24A, 24B of the inductor 20.

A further alternative embodiment to FIG. 2C is shown in FIG. 2E. For those areas of the device 16 which have already been described in connection with FIGS. 2A to 2D, the corresponding reference symbols are also used in FIG. 2E. A difference in this alternative embodiment is that the two effective sections 24A, 24B of the inductor 20 are enclosed by a concentrator 28A, 28B. The concentrator 28A, 28B concentrates the electromagnetic field onto the side of the effective sections 24A, 24B facing the gap S. As in FIG. 2D, the effective sections 24A, 24B are also formed as hollow profiles in FIG. 2E and have integrated cooling channels 27A, 27B. The cooling channels 27A, 27B can be flowed through by a cooling fluid, for example water or oil, in order to cool the effective sections 24A, 24B of the inductor 20. However, different from what is illustrated in FIG. 2E, the concentrators 28A, 28B can also be used with solid effective sections 24A, 24B without cooling channels 27A, 27B.

Figure 3A:
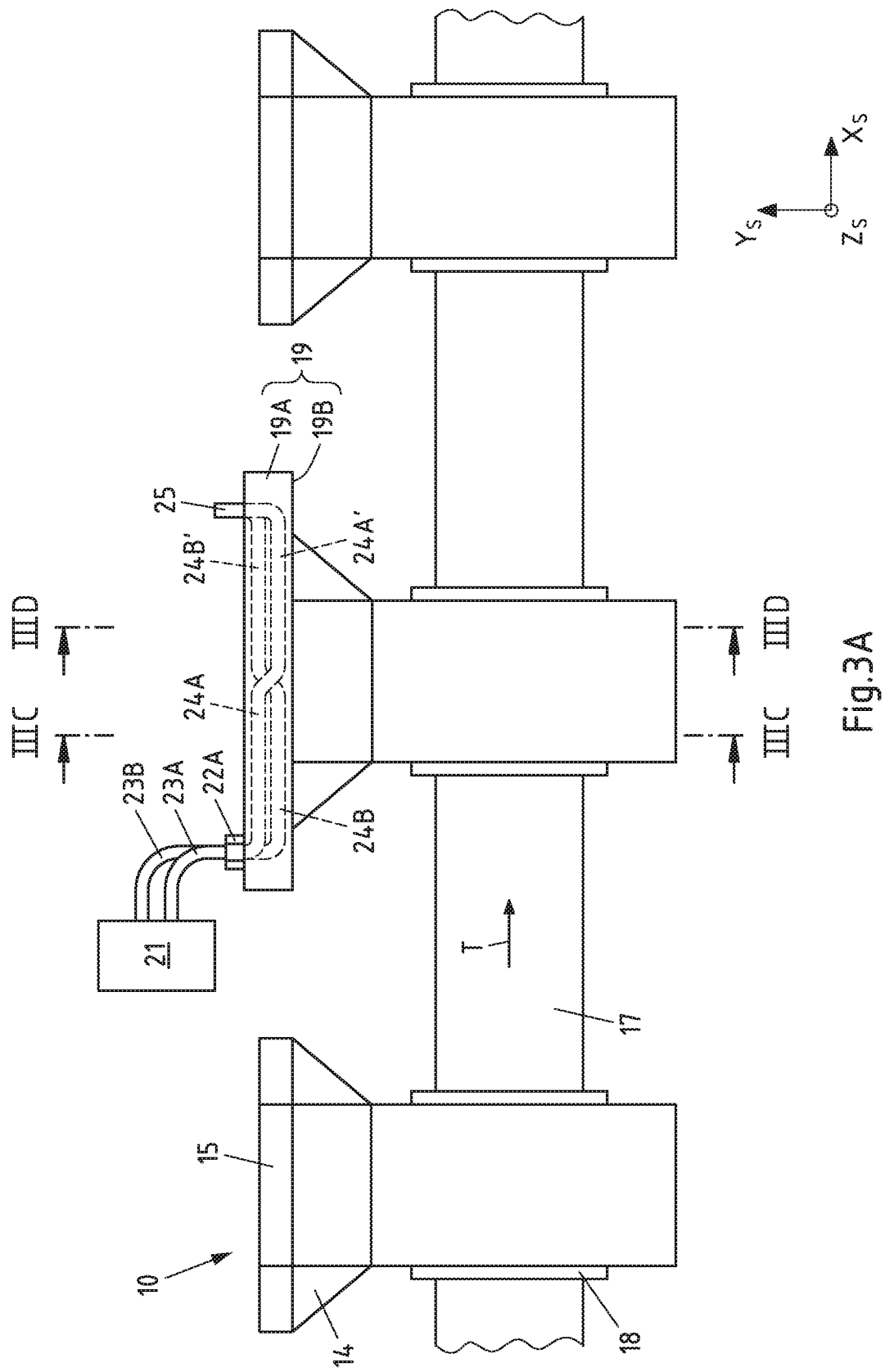
FIG. 3A shows a second embodiment of a device according to the invention in a front view.

In FIG. 3A, a second embodiment of a device 16 according to the invention is illustrated in a front view. For those areas of the device 16 which have already been described in connection with FIGS. 2A to 2E, the corresponding reference symbols are also used in FIG. 3A. A distinctive feature of the second embodiment is that only one inductor 20 is provided which, however, comprises four effective sections 24A, 24A', 24B, 24B'. The two front effective sections 24A, 24A' are assigned to the front holding area 19A and the two rear effective sections 24B, 24B' are assigned to the rear holding area 19B. A height offset 26 occurs between the two front effective sections 24A, 24A'. A height offset 26' is likewise provided between the two rear effective sections 24B, 24B'. The front effective section 24A' and the rear effective section 24B' of the inductor 20 are connected together by the U-shaped bridge 25. The inductor 20 is connected to the unit 21 via connection elements 22A, 22B and cables 23A, 23B.

Figure 3B:
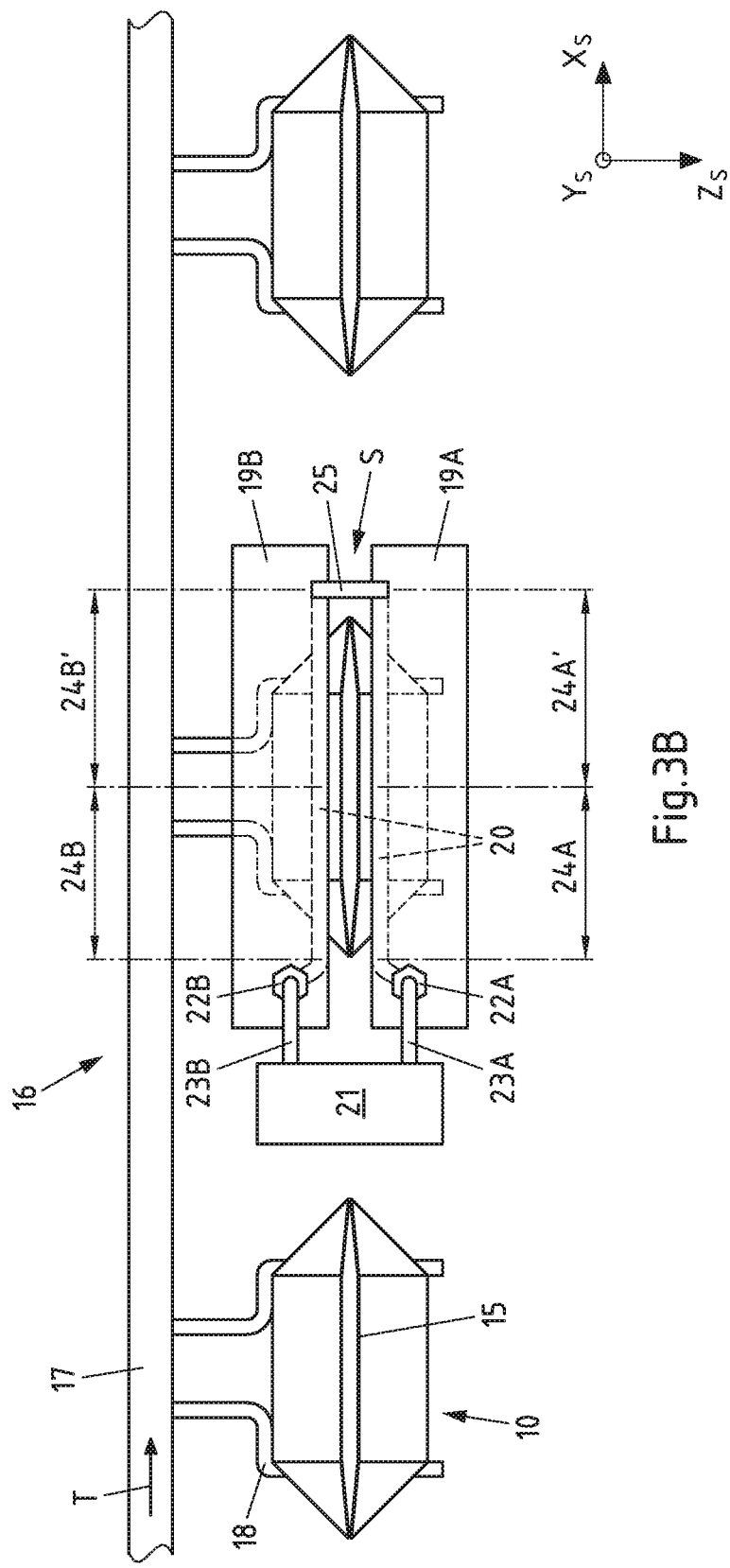
FIG. 3B shows the device from FIG. 3A in a plan view.

FIG. 3B shows the device from FIG. 3A in a plan view. For those areas of the device 16 which have already been described in connection with FIGS. 2A to 3A, the corresponding reference symbols are also used in FIG. 3B. In the plan view, it can be clearly identified that only one single inductor 20 is provided which, however, extends over both holding areas 19A, 19B due to the bridge 25, wherein the two front effective sections 24A, 24A' are assigned to the front holding area 19A, and wherein the two rear effective sections 24B, 24B' are assigned to the rear holding area 19B.

In FIG. 3C, the device from FIG. 3A is illustrated in a sectional view along the plane IIIC-IIIC from FIG. 3A. For those areas of the device 16 which have already been described in connection with FIGS. 2A to 3B, the corresponding reference symbols are also used in FIG. 3C. In the sectional view, the height offset 26, which occurs between the front effective section 24A and the rear effective section 24B of the inductor 20, can be particularly clearly identified. The front effective section 24A is arranged higher than the rear effective section 24B in the sectional plane illustrated in FIG. 3C. The height offset 26 can be in the range between 1 mm and 5 mm.

FIG. 3D shows the device from FIG. 3A in a sectional view along the plane IIID-IIID from FIG. 3A. For those areas of the device 16 which have already been described in connection with FIGS. 2A to 3C, the corresponding reference symbols are also used in FIG. 3D. In the sectional view, the height offset 26', which occurs between the front effective section 24A' and the rear effective section 24B' of the inductor 20, can be particularly clearly identified. The front effective section 24A' is arranged lower than the rear effective section 24B' in the sectional plane shown in FIG. 3D. The height offset 26' can be in the range between 1 mm and 5 mm.

Alternative embodiments to FIGS. 3C/3D are illustrated in FIGS. 3E/3F, wherein FIG. 3E corresponds to the plane IIID-IIID from FIG. 3A, and wherein FIG. 3F corresponds to the plane IIIE-IIIE from FIG. 3A. For those areas of the device 16 which have already been described in connection with FIGS. 2A to 3D, the corresponding reference symbols are also used in FIGS. 3E/3F. A difference in this alternative embodiment is that again the two effective sections 24A, 24B of the inductor 20 are formed as hollow profiles and have integrated cooling channels 27A, 27B. The cooling channels 27A, 27B can be flowed through by a cooling fluid, for example water or oil, in order to cool the effective sections 24A, 24B of the inductor 20. In addition, the two effective sections 24A, 24B of the inductor 20 are enclosed by a concentrator 28A, 28B. Furthermore, both effective sections 24A, 24B of the inductor 20 have a protrusion 29A, 29B which is to concentrate the current flow and hence the electromagnetic field. A height offset 26, 26' again occurs between the protrusion 29A of the front effective section 24A and the protrusion 29B of the rear effective section 24B. The height offset 26, 26' can be in the range between 1 mm and 5 mm. The front protrusion 29A is arranged higher than the rear protrusion 29B in the sectional plane illustrated in FIG. 3E; by contrast, the front protrusion 29A is arranged lower than the rear protrusion 29B in the sectional plane illustrated in FIG. 3F. This can be achieved, for example, by the position of the protrusions 29A, 29B changing over the length of the two effective sections 24A, 24B of the inductor 20. The protrusions 29A, 29B can, in addition to the illustrated profile shape with a rectangular cross-section, also have profile shapes with other cross-sections or partial cross-sections, for example polygonal, round or oval cross-sections or partial cross-sections.

Figure 4A:
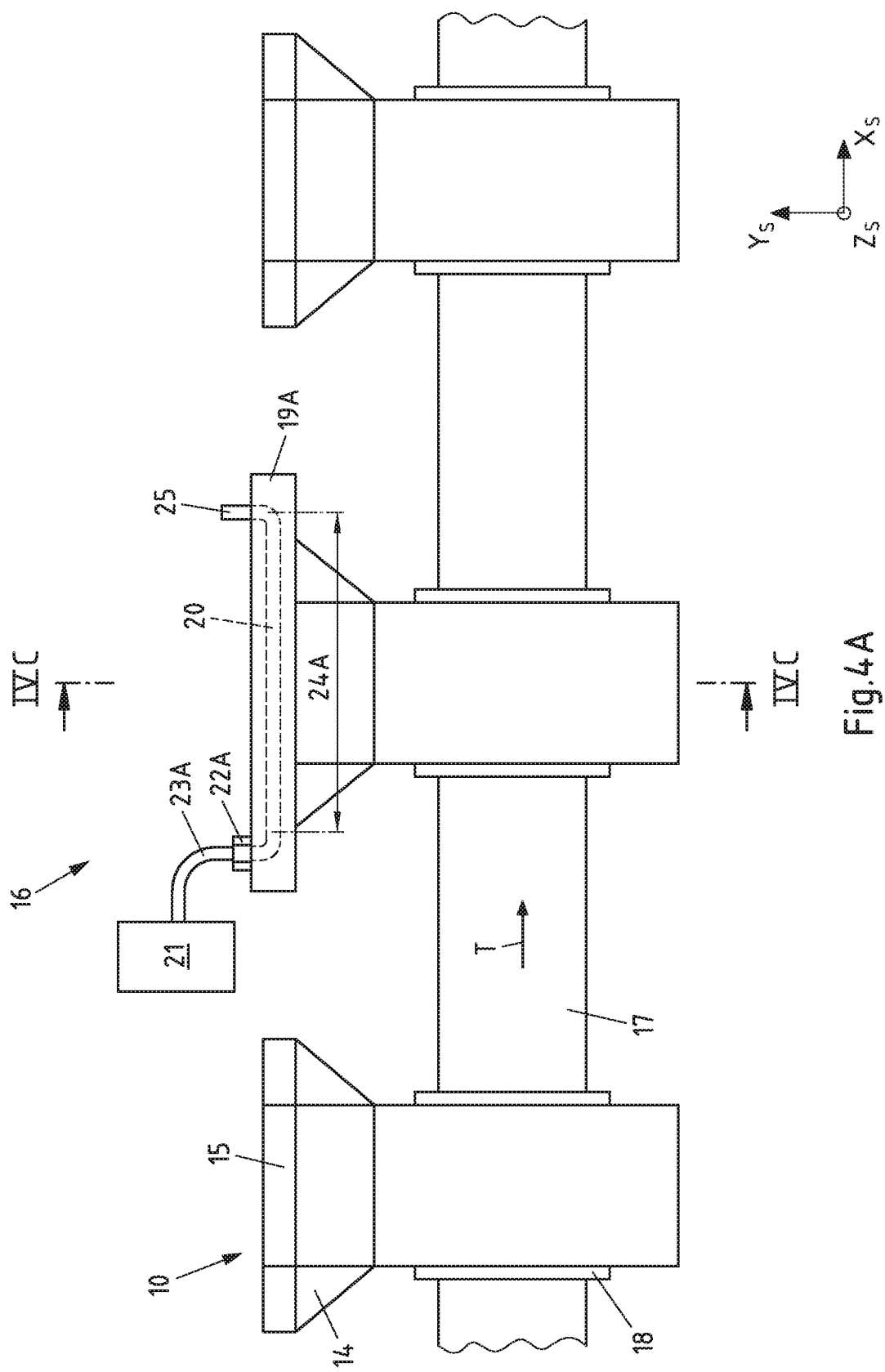
FIG. 4A shows a third embodiment of a device according to the invention in a front view.

A third embodiment of a device 16 according to the invention is illustrated in FIG. 4A in a front view. For those areas of the device 16 which have already been described in connection with FIGS. 2A to 3F, the corresponding reference symbols are also used in FIG. 4A. A special feature of the third embodiment is that the height offset 26 is achieved by inclining the two holding areas 19A, 19B and the effective sections 24A, 24B of the inductor 20 assigned to them. This is explained in more detail in connection with FIG. 4C.

Figure 4B:
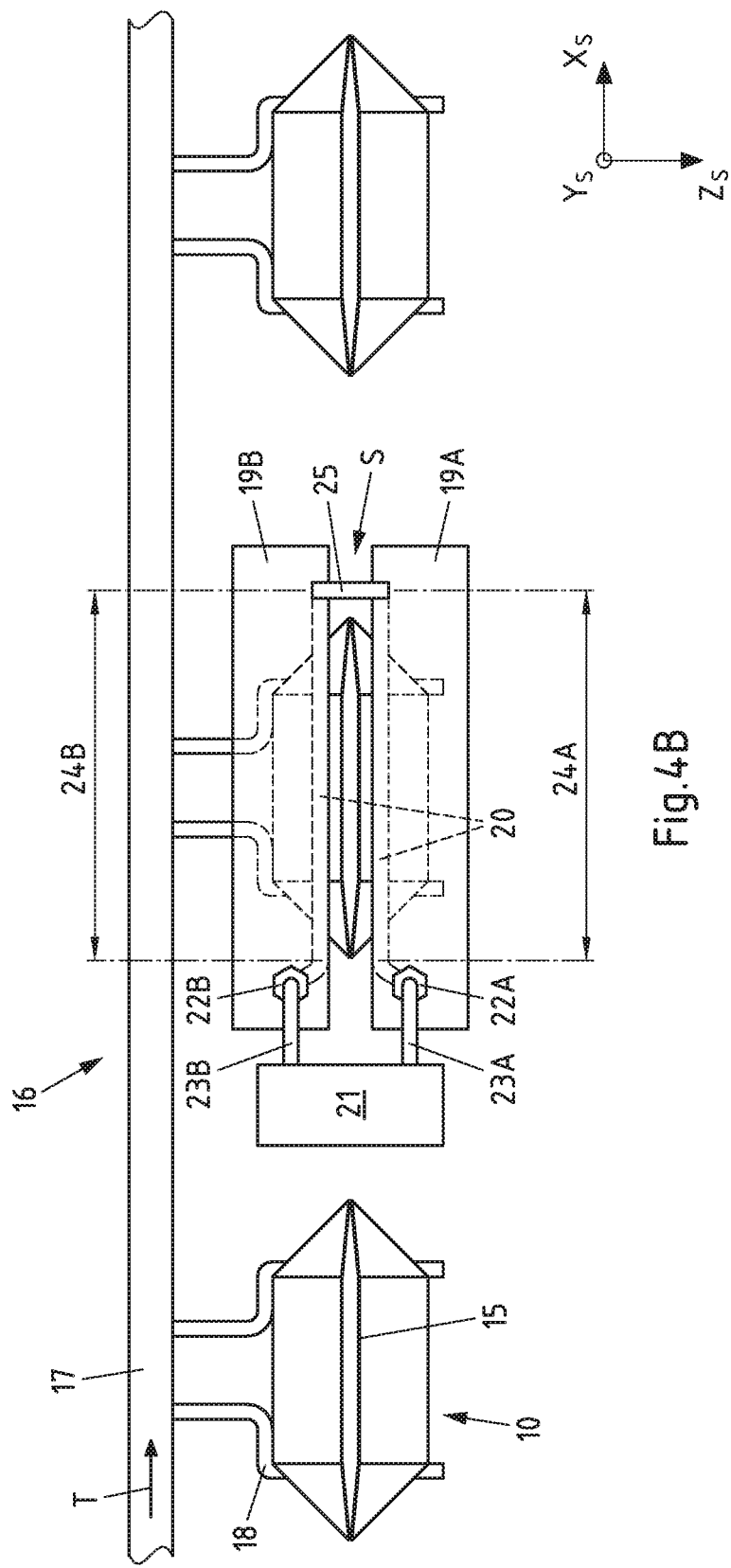
FIG. 4B shows the device from FIG. 4A in a plan view.

FIG. 4B shows the device 16 from FIG. 4A in a plan view. For those areas of the device 16 which have already been described in connection with FIGS. 2A to 4A, the corresponding reference symbols are also used in FIG. 4B. FIG. 4B largely corresponds to FIG. 2B, since the inclination of the two holding areas 19A, 19B and the effective sections 24A, 24B of the inductor 20 assigned to them cannot be identified in the plan view. The inclination will therefore be taken up in connection with FIG. 4C.

In FIG. 4C, the device 16 from FIG. 4A is illustrated in a sectional view along the plane IVC-IVC from FIG. 4A. For those areas of the device 16 which have already been described in connection with FIGS. 2A to 4B, the corresponding reference symbols are also used in FIG. 4C. In the sectional view, the inclined position of the holding areas 19A, 19B and of the effective sections 24A, 24B of the inductor 20 mounted in them can be identified. Axes 30A, 30B, which are arranged at right angles to the surfaces of the holding areas 19A, 19B, run through the holding areas 19A, 19B. In addition, the center plane 31, which is spanned by the longitudinal direction $X_S$ and the vertical direction $Y_S$ of the gap S and which the transverse direction $Z_S$ of the gap is perpendicular to, runs centrally through the package sleeve 10. An angle α is formed between the front axis 30A and the center plane 31 and an angle β is formed between the rear axis 30B and the center plane 31. By both angles α, β adopting different values, a height offset 26 is obtained between both effective sections 24A, 24B of the inductor 20. The height offset 26 can be in the range between 1 mm and 5 mm.

A fourth embodiment of a device 16 according to the invention is illustrated in FIG. 5A in a front view. For those areas of the device 16 which have already been described in connection with FIGS. 2A to 4C, the corresponding reference symbols are also used in FIG. 5A. In the fourth embodiment, two separate inductors 20A, 20B are present, wherein the first inductor 20A is assigned to the front holding area 19A, and wherein the second inductor 20B is assigned to the rear holding area 19B. Both inductors 20A, 20B are connected to the unit 21 via connection elements 22A, 22B and cables 23A, 23B. Each of the inductors 20A, 20B has two effective sections 24A, 24A', 24B, 24B'. The effective sections 24A, 24B are arranged above the effective sections 24A', 24B' and are a bit shorter than them. However, the effective sections 24A, 24B—different from what is illustrated in FIG. 5A—can be formed with the same length as or can be longer than the effective sections 24A', 24B'.

Figure 5B:
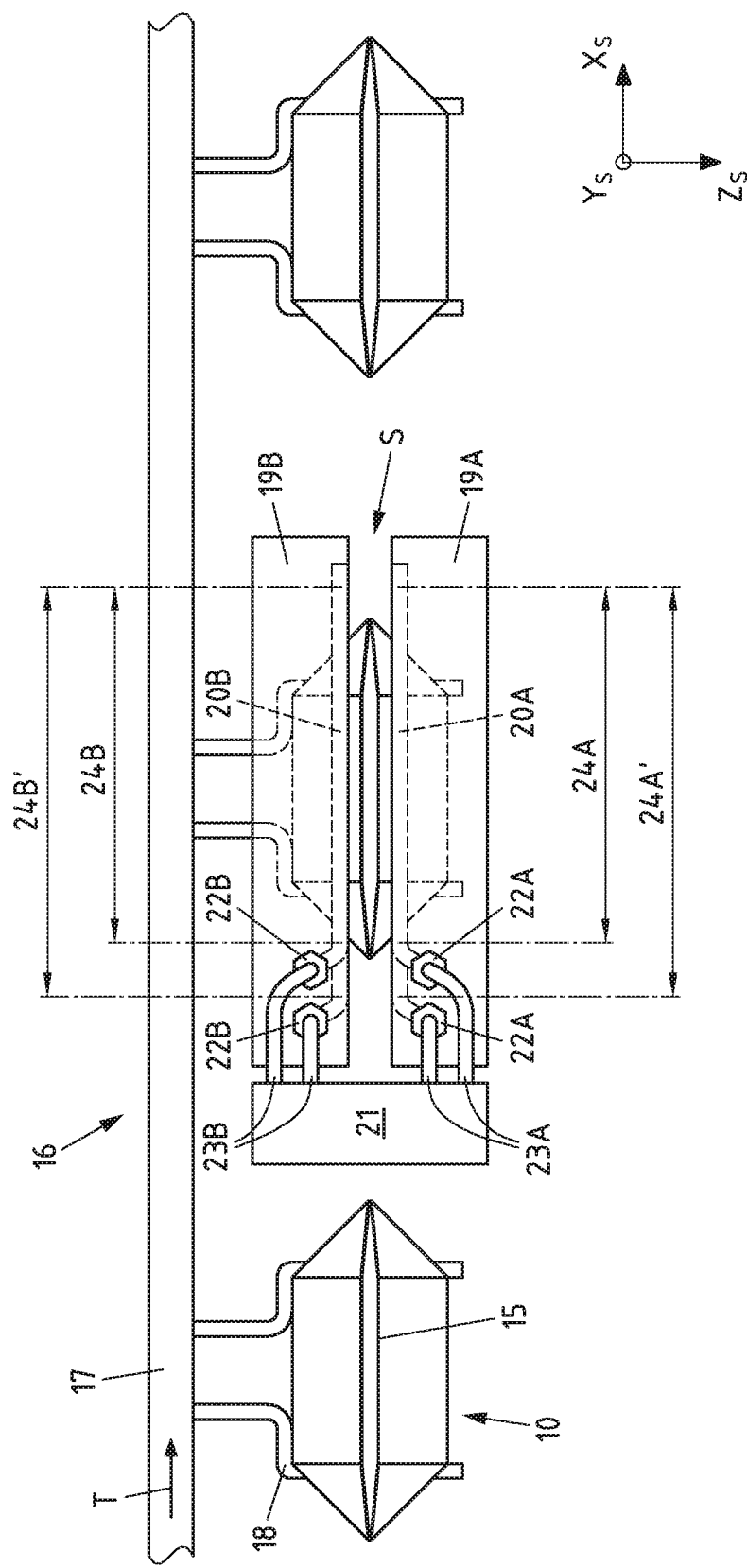
FIG. 5B shows the device from FIG. 5A in a plan view and FIG. 5C shows the device from FIG. 5A in a sectional view along the plane VC-VC from FIG. 5A.

FIG. 5B shows the device from FIG. 5A in a plan view. For those areas of the device 16 which have already been described in connection with FIGS. 2A to 5A, the corresponding reference symbols are also used in FIG. 5B. In the plan view, it can be clearly identified that the inductor 20A and its two effective sections 24A, 24A' arranged one above the other are assigned to the front holding area 19A and that the inductor 20B and its two effective sections 24B, 24B' arranged one above the other are assigned to the rear holding area 19B.

Figure 5C:
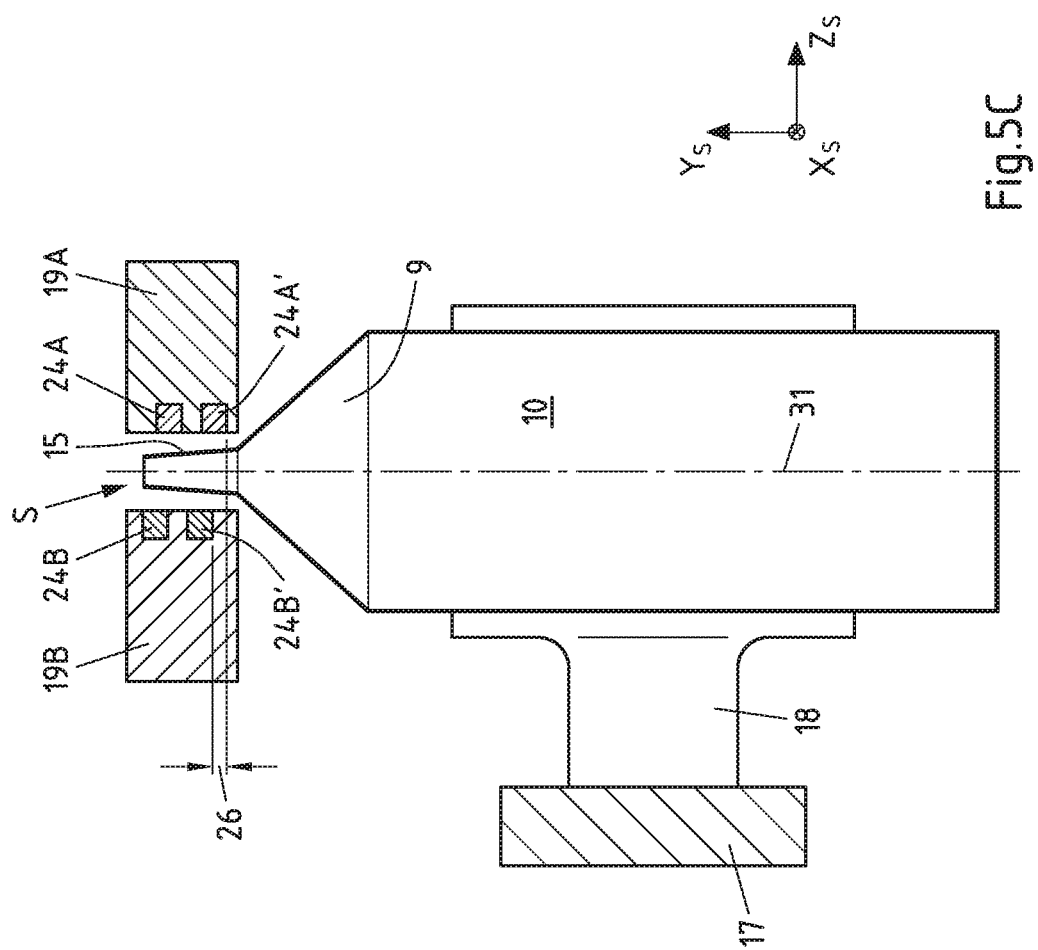

Finally, in FIG. 5C, the device 16 from FIG. 5A is illustrated in a sectional view along the plane VC-VC from FIG. 5A. For those areas of the device 16 which have already been described in connection with FIGS. 2A to 5B, the corresponding reference symbols are also used in FIG. 5C. In the sectional view, it can be clearly identified that a height offset 26 is present between the effective sections 24A, 24A' of the front inductor 20A and the effective sections 24B, 24B' of the rear inductor 20B. The height offset 26 can be in the range between 1 mm and 5 mm. It can also be clearly identified that the effective sections 24A, 24B are arranged higher than the effective sections 24A', 24B'. Different from what is illustrated in FIG. 5C, provision can also be made for an inductor 20 to be provided only on one side of the gap S, i.e. only in one of the two holding areas 19A, 19B, while the other holding area 19a, 19B does not have any inductor 20 and therefore only serves as a mechanical guide for the package sleeves 10.

The features of all four previously illustrated and described embodiments of the device can be combined with one another. In particular, each of the embodiments can either have one inductor 20, which extends over both holding areas 19A, 19B by means of a bridge 25, or alternatively can have two separate inductors 20A, 20B which in each case are only assigned to one of the two holding areas 19A, 19B. In addition, the different methods for obtaining a height offset 26 can be combined with one another. Finally, cooling channels 27 and/or concentrators 28 and/or protrusions 29 can be provided with every embodiment, if this is desired or required.

LIST OF REFERENCE SYMBOLS

1: Blank
2: Fold line
3, 4: Lateral areas
5: Front area
6: Rear area
7: Sealing area
8: Base area
9: Gable area
10: Package sleeve
11: Longitudinal seam
12: Rectangular area
13: Triangular area
14: Ear
15: Fin seal
16: Device
17: Conveyor belt
18: Cell
19: Holding unit
19A, 19B: Holding area
20, 20A, 20B: Inductor
21: Unit for producing an alternating current
22, 22A, 22B: Connection element
23, 23A, 23B: Cable
24, 24A, 24A', 24B, 24B': Effective section (of the inductor)
25: Bridge
26, 26', 26A, 26B: Height offset
27, 27A, 27B: Cooling channel
28, 28A, 28B: Concentrator
29A, 29B: Protrusion
30A, 30B: Axis
31: Center plane (of the package sleeve)
S: Gap
T: Conveying direction
$X_S$: Longitudinal direction (of the gap S)
$Y_S$: Vertical direction (of the gap S)
$Z_S$: Transverse direction (of the gap S)
α: Angle
β: Angle

The invention claimed is:

1. A device for inductively heating package sleeves, comprising:
   at least one unit for producing an alternating current,
   at least one inductor having at least two effective sections, and
   a holding unit having a front holding area and a rear holding area for mounting the inductor,
   wherein the inductor is connected to the at least one unit for producing the alternating current,
   wherein the holding areas are arranged in such a way that a gap is formed between the front holding area and the rear holding area, a longitudinal direction of the gap corresponds to a conveying direction of the package sleeves,
   wherein the at least two effective sections of the inductor are at least in sections arranged asymmetrically to one another in relation to a centre plane lying in the gap,
   wherein a width of the gap in a transverse direction is in a range of between 1 millimeter and 3 millimeters,
   wherein at least one effective section of the at least two effective sections of the at least one inductor is assigned to the front holding area and at least one effective section of the at least two effective sections of the at least one inductor is assigned to the rear holding area, and
   wherein a height offset is provided between the at least one front effective section and the at least one rear effective section of the at least one inductor, the height offset being in a range of between 0.5 mm and 10 mm.

2. The device according to claim 1, wherein the at least two effective sections of the at least one inductor are formed linearly and run parallel to the conveying direction of the package sleeves.

3. The device according to claim 1, wherein the at least one inductor has a bridge for bridging the gap.

4. The device according to claim 1, wherein at least one of the at least two effective sections of the at least one inductor is formed as a hollow profile having an integrated cooling channel.

5. The device according to claim 1, wherein at least one of the least two effective sections of the at least one inductor is enclosed by a concentrator.

6. The device according to claim 1, wherein at least one of the at least two effective sections of the at least one inductor has a protrusion.

7. The device according to claim 1, wherein at least one of the holding areas is inclined by an angle in a range of between 50 and 300, with respect to the centre plane.

8. The device according to claim 1, further comprising at least two inductors, wherein each of the at least two inductors is connected to a unit for producing an alternating current.

9. The device according to claim 1,
   further comprising
   a conveyor belt having cells for receiving the package sleeves.

10. The device according to claim 1,
    further comprising
    a guiding mechanism for conditioning a gable geometry of the package sleeves.

11. A method for inductively heating package sleeves, comprising the following steps:
    providing a device for inductively heating package sleeves having at least one inductor having at least two effective sections;
    providing package sleeves with an electrically conductive area; and
    producing an alternating electromagnetic field;
    wherein the alternating electromagnetic field is produced by the at least two effective sections of the at least one inductor which are arranged asymmetrically to one another in relation to a centre plane lying in a gap,
    wherein a width of the gap in a transverse direction is in a range between 1 millimeter and 3 millimeters,
    wherein at least one effective section of the at least two effective sections of the at least one inductor is assigned to a front holding area of a holding unit and at least one effective section of the at least two effective sections of the at least one inductor is assigned to a rear holding area of the holding unit, and
    wherein a height offset is provided between the at least one front effective section and the at least one rear effective section of the at least one inductor, the height offset being in a range of between 0.5 mm and 10 mm.

12. The method according to claim 11, further comprising using a direct current voltage in a range of between 20 V and 1000 V to produce the alternating electromagnetic field.

13. The method according to claim 11, further comprising producing the alternating electromagnetic field with a frequency in a range of between 30 kHz and 2000 kHz.

14. The method according to claim 11, further comprising moving the package sleeves relative to the device.

* * * * *